United States Patent [19]
Akazaki et al.

[11] Patent Number: 5,946,906
[45] Date of Patent: Sep. 7, 1999

[54] EXHAUST GAS PURIFICATION SYSTEM OF INTERNAL COMBUSTION ENGINE

[75] Inventors: Shusuke Akazaki; Kohei Hanada; Yuji Yasui; Tadashi Satoh; Takashi Haga, all of Woko, Japan

[73] Assignee: Honda Giken Kogyo Kabushiki Kaisha, Tokyo, Japan

[21] Appl. No.: 08/975,101

[22] Filed: Nov. 20, 1997

[30] Foreign Application Priority Data

Nov. 20, 1996 [JP] Japan ..................................... 8-324809

[51] Int. Cl.$^6$ ....................................................... F01N 3/00
[52] U.S. Cl. ............................... 60/278; 60/284; 60/288; 60/297
[58] Field of Search ............................. 60/278, 284, 288, 60/297, 311

[56] References Cited

U.S. PATENT DOCUMENTS

| | | | |
|---|---|---|---|
| 5,125,231 | 6/1992 | Patil et al. | 60/288 |
| 5,207,734 | 5/1993 | Day et al. | 60/278 |
| 5,315,824 | 5/1994 | Takeshima . | |
| 5,388,405 | 2/1995 | Fujishita et al. | 60/297 |
| 5,544,482 | 8/1996 | Matsumoto et al. . | |
| 5,657,736 | 8/1997 | Maki et al. . | |

FOREIGN PATENT DOCUMENTS

| | | |
|---|---|---|
| 0 616 115 | 9/1994 | European Pat. Off. . |
| 0 719 926 | 7/1996 | European Pat. Off. . |
| 43 28 125 | 2/1994 | Germany . |
| 4-17710 | 1/1992 | Japan . |
| 5-171929 | 7/1993 | Japan . |
| 6-101461 | 4/1994 | Japan . |
| 8-71427 | 3/1996 | Japan . |

OTHER PUBLICATIONS

Patent Abstracts of Japan, vol. 018, No. 607 (M–1707), Nov. 18, 1994 & JP 06–229324 (Nissan Motor Co. Ltd), Aug. 16, 1994.

Patent Abstracts of Japan, vol. 095, No. 005, Jun. 30, 1995 & JP 07–042538 (Fuji Heavy Ind. Ltd.), Feb. 10, 1995.

Patent Abstracts of Japan, vol. 016, No. 173 (M–1240), Apr. 24, 1992 & JP 04–017710 (Mazda Motor Corp.), Jan. 22, 1992.

*Primary Examiner*—Thomas E. Denion
*Attorney, Agent, or Firm*—Nikaido, Marmelstein, Murray & Oram, LLP

[57] ABSTRACT

A system for purifying exhaust gas generated by an internal combustion engine including a bypass branching out from the exhaust pipe downstream of a catalyst and merging to the exhaust pipe, an adsorber installed in the bypass, a bypass valve member which closes the bypass, and an EGR conduit connected to the bypass at one end and connected to the air intake system for recirculating the exhaust gas to the air intake system. The bypass valve member is opened for a period after engine startup to introduce the exhaust gas such that the adsorber installed in the bypass adsorbs the unburnt HC component in the exhaust gas. The adsorber adsorbs the HC component when the exhaust temperature rises and the adsorbed component is recirculated to the air intake system through the EGR conduit. In the system, the bypass valve is provided at or close to the branching point in the exhaust pipe and a chamber is provided close to the branching point such that the conduit is connected to the bypass at the one end in the chamber. The bypass valve member is combined with an exhaust pipe valve member as a combination valve such that when the bypass valve member closes the bypass, the exhaust pipe valve member opens the exhaust pipe. With the arrangement, the system can effectively prevent the exhaust pipe from being clogged even when a valve for closing a bypass is stuck in the closed position. At the same time, the system can provide a relatively short EGR conduit for recirculating unburnt HC component adsorbed from the adsorber and the adsorption and desorption are conducted optimally.

24 Claims, 17 Drawing Sheets

FROM ENGINE STARTING AND LOW TEMPERATURE (HC ADSORBTION MODE)

NORMAL TEMPERATURE AND WITHOUT EGR (HC TRAPPING MODE)

NORMAL TEMPERATURE AND WITH EGR (HC PURGING MODE)

FIG. 14

KEGRN

| Current value | NO |
|---|---|
|  | 0 |
| 1 TDC earlier | 1 |
| 2 TDCs earlier | 2 |
| 3 TDCs earlier | 3 |
| 4  // | 4 |
| 5  // | 5 |
| 6  // | 6 |
| 7  // | 7 |
| 8  // | 8 |
| 9  // | 9 |
| 10  // | 10 |
| 11  // | 11 |
| 12  // | 12 |
| ⋮ | ⋮ |
| n | n |

FIG. 15

| | Pb | | | |
|---|---|---|---|---|
| Ne | | | | |
| | | | $\tau$ | |
| | | | | |

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine for removing an unburnt HC component from the exhaust gas.

2. Description of the Related Art

Internal combustion engines are ordinarily provided with a catalyst (a three-way catalytic converter) in the exhaust system which removes HC, NOx and CO components in the exhaust gas generated by the engine. However, when the engine is cold started, for example, and the catalyst is not activated, an unburnt HC component is immediately exhausted to the atmosphere.

For that reason, there is proposed an exhaust gas purification system in Japanese Laid-Open Patent Application Hei 4(1992)-17,710. In the system, the exhaust pipe 5 is branched out at a location downstream of the catalysts 6, 7. The bypass 9 is provided with an adsorber 10 made of active carbon or activated charcoal and carried on two beds. The bypass is again merged to the exhaust pipe 5 downstream of the adsorber. An Exhaust Gas Recirculation (EGR) conduit 15 is connected before the merging point where the bypass 9 is located such that an unburnt HC component, when adsorbed, is recirculated to the engine intake system through the EGR conduit 15. A valve 14 is provided in the bypass 9 downstream thereof to open or close the bypass 9. Moreover, another valve 13 is provided in the exhaust pipe 5 to close the same so as to lead the exhaust gas to flow into the bypass 9. Japanese Laid-Open Patent Applications Hei 5 (1993)-171,929 and Hei 6 (1994)-101,461 disclose similar systems.

In the prior art system (described in 4-17,710), if the bypass valve 14 sticks in the closed position when the exhaust pipe valve 13 closes the exhaust pipe 5, the exhaust system becomes clogged thus rendering the engine to stall. Moreover, since the bypass 9 is connected with the EGR conduit 15 downstream of the adsorber 10, the bypass valve 14 is indispensable and can not be omitted. Therefore, the system requires that both the exhaust pipe valve 13 and the bypass valve 14 are provided separately and independently of each other. In the prior art system, without the bypass valve 14, the unburnt HC component adsorbed will not flow to the EGR conduit 15, but flow to the exhaust pipe 5 and to the atmosphere.

The bypass valve 14 and the exhaust pipe valve 13 is subjected to the hot exhaust gas and should accordingly have the property of being heatproof. The provision of such a kind of valve is highly disadvantageous in terms not only of manufacturing cost but also of durability and reliability of the exhaust system. Furthermore, as mentioned above, the separate provision of the valves will increase the probability that the exhaust pipe becomes clogged.

Furthermore, since the bypass is connected with the EGR conduit 15 downstream of the adsorber 10, the EGR conduit may be long, depending on the engine layout. In an ordinary vehicle, the engine is usually mounted at its front and the engine exhaust system including a catalyst extends toward the rear of the vehicle under the floor structure. The distance between the connection point of the bypass with the EGR conduit and the engine increases as the connection point is situated closer to the rear of the vehicle.

Similar disadvantages are found in the other prior art systems (disclosed in 5-171,929 and 6-101,461).

SUMMARY OF THE INVENTION

An object of the invention is therefore to provide an exhaust gas purification system of an internal combustion engine having an adsorber for adsorbing the unburnt HC component in the exhaust gas generated by the engine, which can solve the drawbacks in the prior art systems, and which can effectively prevent the exhaust pipe from becoming clogged even if a valve for closing a bypass is stuck in the closed position.

A second object of the invention is therefore to provide an exhaust gas purification system of an internal combustion engine having an adsorber for adsorbing the unburnt HC component in the exhaust gas generated by the engine, which can provide a relatively short EGR conduit for recirculating an unburnt HC component adsorbed from the adsorber.

A third object of the invention is to provide an exhaust gas purification system of an internal combustion engine having an adsorber for adsorbing the unburnt HC component in the exhaust gas generated by the engine, in which adsorption and desorption are conducted optimally.

This invention achieves this object by providing a system for purifying exhaust gas generated by an internal combustion engine having an air intake system and an exhaust system which includes an exhaust pipe extending from an exhaust manifold of the engine and a catalyst installed in the exhaust pipe, the exhaust system exhausting gas generated by the engine to the atmosphere, including a bypass branching out from the exhaust pipe at a location downstream of the catalyst and merging to the exhaust pipe downstream of the branching point, an adsorber installed in the bypass, a valve means which closes the bypass, a conduit connected to the bypass at one end and connected to the air intake system for recirculating the exhaust gas to the air intake system, valve control means which opens the valve means for a period since starting of the engine to introduce the exhaust gas to the bypass such that the adsorber installed in the bypass adsorbs the unburnt component in the exhaust gas and an EGR control means which causes the exhaust gas introduced in the bypass to be recirculated to the air intake system through the conduit. In the system it is configured such that the valve means is provided at or close to the branching point in the exhaust pipe and a chamber is provided close to the branching point such that the conduit is connected to the bypass at the one end in the chamber.

BRIEF EXPLANATION OF THE DRAWINGS

These and other objects and advantages of the invention will be more apparent from the following description and drawings, in which:

FIG. 14 is an explanatory view showing the configuration of a ring buffer referred to in the flow chart of FIG. 13;

FIG. 15 is an explanatory view of a delay time referred to in the flow chart of FIG. 13;

PREFERRED EMBODIMENTS OF THE INVENTION

Embodiments of the invention will now be explained with reference to the drawings.

Figure 1:
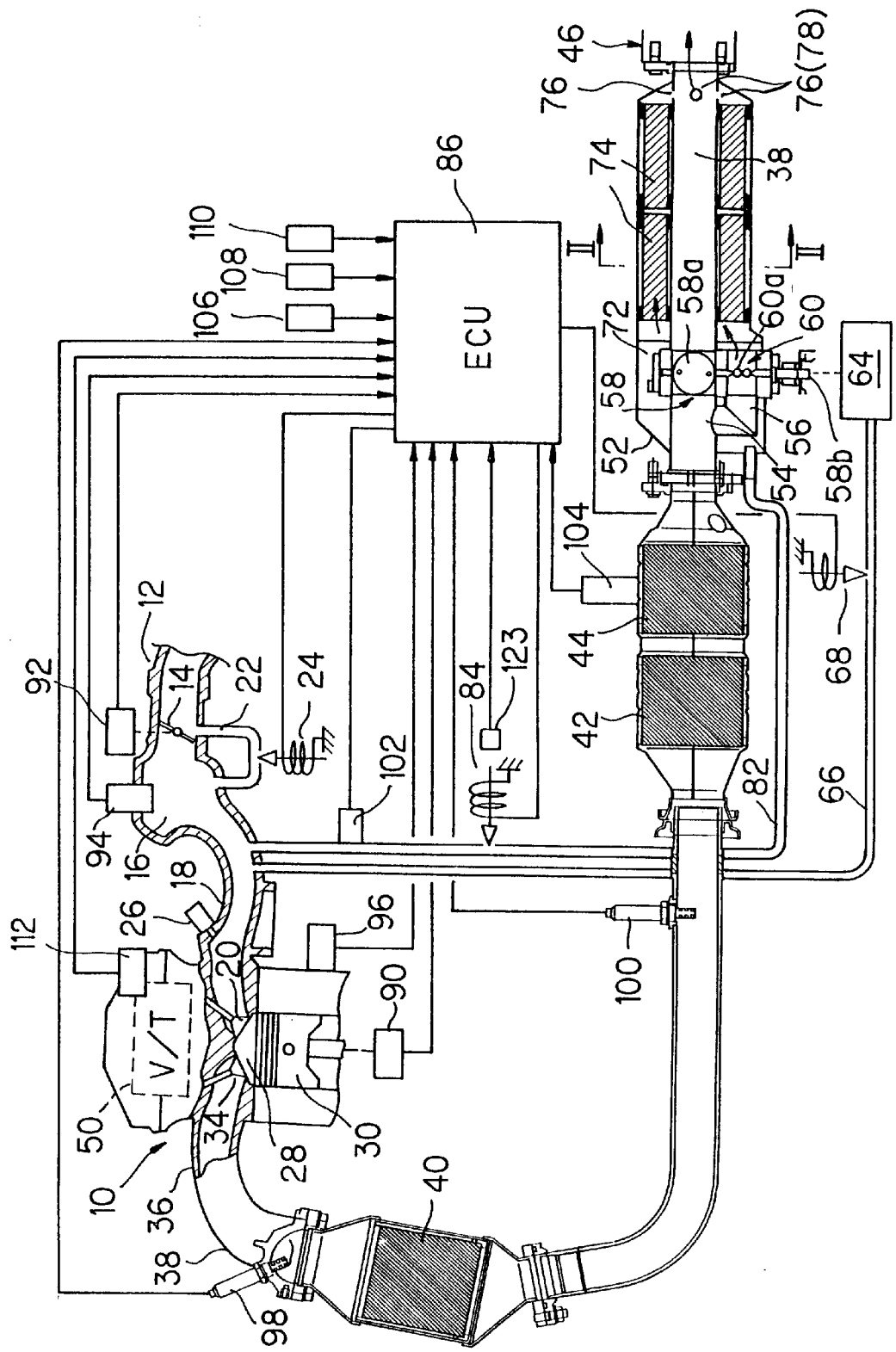
FIG. 1 is an overall schematic view showing an exhaust gas purification system of an internal combustion engine according to the present invention having catalysts and an adsorber which adsorbs the unburnt HC component exhausted by the engine.

FIG. 1 is an overview of an exhaust gas purification system of an internal combustion engine according to the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders through a surge tank 16, an intake manifold 18 and two intake valves 20 (only one is shown), while the flow thereof is adjusted by a throttle valve 14. The throttle valve 14 is bypassed by a bypass 22 provided at the air intake pipe 12. A valve (often referred to as EACV) 24 comprised of an electromagnetic solenoid valve is installed in the bypass 22 for closing the same.

A fuel injector 26 is installed in the vicinity of the intake valves 20 of each cylinder for injecting fuel into a combustion chamber 28 of the cylinder concerned. The injected fuel mixes with the intake air to form an air-fuel mixture that is ignited in the cylinder chamber by a spark plug (not shown). The resulting combustion of the air-fuel mixture drives a piston 30 downward in the figure.

The exhaust gas produced by the combustion is discharged through two exhaust valves 34 (only one is shown) into an exhaust manifold 36, from where it passes through an exhaust pipe or passage 38 to a first catalytic converter 40 installed immediately below the exhaust manifold 36 and a second catalyst 42 and a third catalyst 44 (all three-way catalytic converters) where noxious components are removed therefrom before it is discharged to the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics, a characteristic for low engine speed and a characteristic for high engine speed, in response to engine speed Ne and manifold pressure Pb. Since this is a well-known mechanism, however, it will not be described further here.

The exhaust pipe 38 is connected with a chamber 52 at a location downstream of the third catalyst 44. More specifically, the chamber 52 is provided in such a manner that it surrounds the exhaust pipe 38. In the chamber 52, the exhaust pipe 38 branches out at a fork 54 to form a bypass or conduit 56.

A combination valve is provided in the vicinity of the fork 54. The combination valve comprises of an exhaust pipe valve member 58 which opens/closes the exhaust pipe 38 and a bypass valve member 60 which opens/closes the bypass 56. The valves members 58, 60 are of a butterfly-type (like the throttle plate 14) and are comprised of a first disk (vane) 58a, a second disk (vane) 60a and a shaft 58b connected thereto. The disks 58a, 60a are connected to the shaft 58b at right angles (90 degrees) with each other such that when the first disk element 58a closes the exhaust pipe, the second disk element 58b open the bypass 60, and vice versa. With the arrangement, even if one valve member sticks to the closing position, the other is forced to open. Therefore, since the exhaust gas can flow either of the exhaust pipe 58 or to the bypass 60, clogging is less likely to occur.

The shaft 58b is connected to a valve actuator 64. The valve actuator 64 has a conduit 66 which is connected to the air intake pipe 12 at a location downstream of the throttle valve 14. The valve actuator 64 operates the exhaust pipe valve member 58 to close the exhaust pipe and the bypass valve member 60 to open the bypass 56, when a negative pressure is introduced from the intake air pipe 12 through the conduit 66. In other words, unless a negative pressure is introduced in the actuator 64 the exhaust pipe valve member 58 is forced to open the exhaust pipe 38 and the bypass valve member 60 is forced to close the bypass 56, as shown in FIG. 1.

An electromagnetic solenoid valve (referred to later as "TRPV") 68 is installed in the conduit 66, which opens/closes the conduit in response to a command generated by and sent from an electronic control unit (referred to later as "ECU") 86. Thus, the valve actuator 64 operates to open or close the valve members 58, 60.

The chamber 52 is configured to completely encircle the exhaust pipe 38 such that a space 72 is formed along the exhaust pipe 38 between the exhaust pipe 38 and the chamber 52. An adsorber 74 carried on two beds is housed in the space 72 at a position downstream or close to the vehicle rear assembly 46. The adsorber adsorbs or absorbs the unburnt HC component under low temperature and adsorbs it under high temperature.

Figure 2:
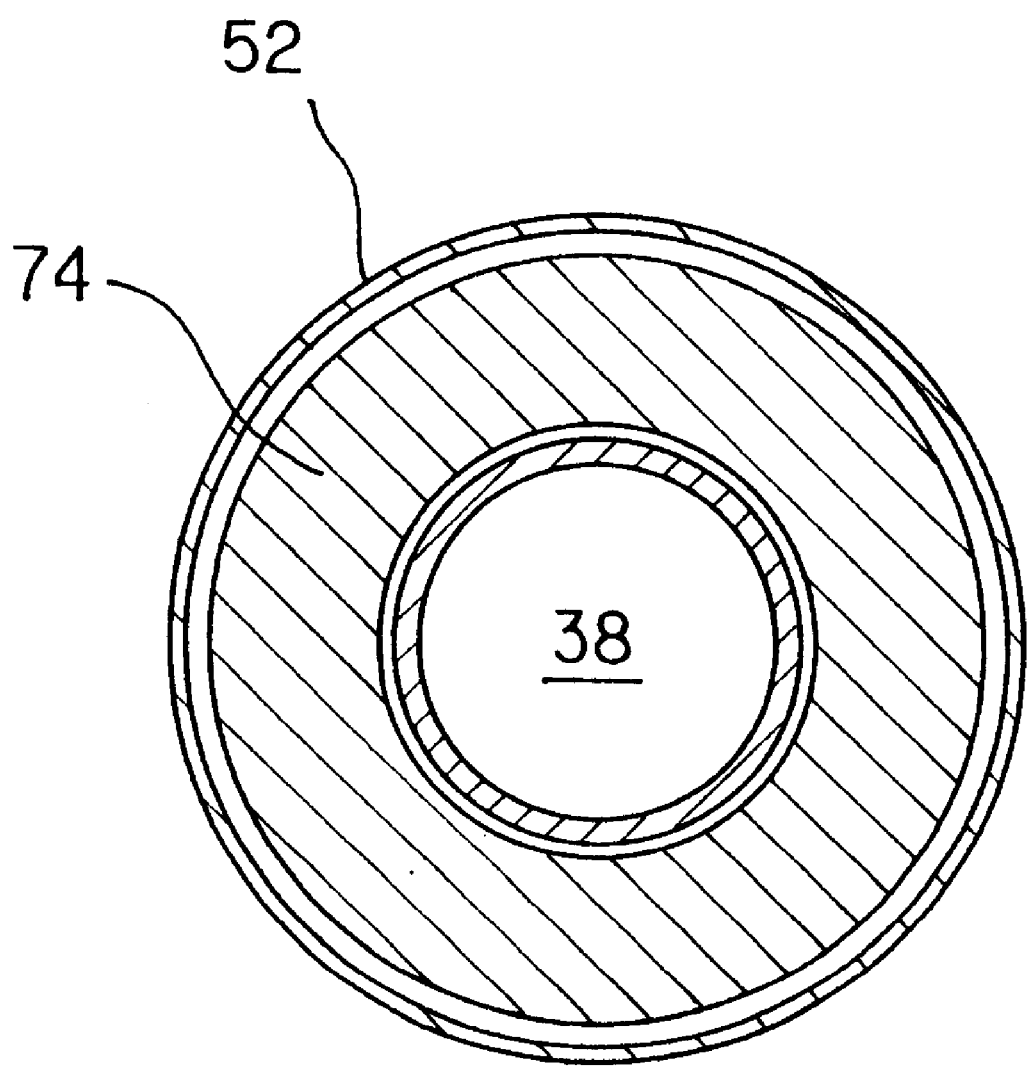
FIG. 2 is a cross-sectional view taken along the line II—II in FIG. 1.

The exhaust pipe 38 is provided, at its far end, with four holes 76 which are circumferentially located at intervals of 90 degrees. The bypass 56 is thus formed from the fork 54 and extends into the chamber 52 (the space 72) via the adsorber 74 up to holes 76 (a confluence point 78) where it merges into the exhaust pipe 38. As illustrated in FIG. 2, the chamber is circular in cross section and encircles the exhaust pipe 38 in such a manner that the adsorber 74 is positioned as close to the exhaust pipe 38 as possible to receive heat such that it adsorbs the adsorbed unburnt HC component to be recirculated to the air intake system.

The chamber is connected, at the fork 54 (or at a location close to the fork 54), to an EGR conduit 82. The EGR conduit 82 is connected, at the other end, to the air intake pipe 12 at a position downstream of the throttle valve 14. The EGR conduit 82 is provided with an EGR control valve (electromagnetic solenoid valve) 86 which closes the conduit in response to a command generated by and sent from the ECU 86. The lifting or stroke of the valve 86 is sensed by a lift sensor (not shown) and based on the sensed value, the ECU 86 controls the rate or amount of EGR.

Thus, since the valve members 58, 60 are positioned in the chamber 52, even if the exhaust gas leaks from, for example, a bearing of the shaft 58b, the impact of the gas leakage is kept to a minimum. Therefore, the tolerance in manufacturing the shaft, valves, etc., can be less strict.

The adsorber 74 is preferably made from a material comprised of a mixture of crystalline aluminosilicate and a catalyzer element, preferably a mixture of ZSM-5 zeolite and a catalyzer element as is proposed by the assignee in Japanese Laid-Open Patent Application No. Hei 8 (1996)-71,427. More specifically, ZSM-5 zeolite and a catalyzer element are mixed and are slurried. A honeycomb-like member (the bed) is dipped in the slurry and is then raised and dried so that the adsorber 74 is attached to the surface of the honeycomb member.

The crystalline aluminosilicate is heat-resistant to a temperature of 900° C. to 1000° C. and exhibits excellent heat proof properties compared to the active carbon used in the prior art. (The heat-resistant temperature is a temperature when the BET (Brunauer-Emmett-Teller) ratio surface area maintains 95% of the initial value when heated). The adsorber 74 adsorbs the unburnt HC component under low ambient temperature, i.e., when the exhaust temperature is at or below 100° C. and adsorbs or release the captured HC component at the exhaust temperature of 100° C. to 250° C.

The ignition distributor (not shown) of the engine 10 is provided with a crank angle sensor 90 which generates a signal indicative of the crank angles of the piston 30 and a signal indicative of unit angles divided into smaller values. The engine 10 is further provided with a throttle position sensor 92 which generates a signal indicative of the degree of opening θ TH of the throttle valve 14, a manifold absolute pressure (MAP) sensor 94 which generates a signal indicative of the pressure Pb of the intake manifold downstream of the throttle valve 14 in terms of absolute value, and a coolant temperature sensor 96 installed in the vicinity of a coolant passage (not shown) which generates a signal indicative of the temperature Tw of the engine coolant.

Further, an universal air/fuel ratio sensor 98 (named LAF sensor) is provided in the exhaust pipe 38 at or downstream of a confluence point of the exhaust manifold 36 and upstream of the first catalyst 40, where it generates a signal indicative of the oxygen concentration in the exhaust gas. In addition, an $O_2$ sensor 100 is installed in the exhaust pipe 38 at a location downstream of the first catalyst 40, which generates a signal indicative of the oxygen concentration in the exhaust gas. A second $O_2$ sensor 102 is provided in the EGR conduit 82 and generates a similar signal in response to the oxygen concentration in the EGR conduit 82 (explained later).

Furthermore, an exhaust temperature sensor 104 is installed in the vicinity of the third catalyst 44, in other words, close to the catalyst which is closest to the adsorber 74 and generates a signal indicative of the temperature TCAT in the exhaust system. A vehicle speed sensor 106 is provided in the vicinity of a drive shaft (not shown) of the vehicle on which the engine 10 is mounted and generates a signal indicative of the vehicle travelling speed V.

An air conditioner switch (A.C. switch) 108 is provided at a position close to an air conditioner (not shown) installed in the vehicle and generates an ON signal when the air conditioner is in operation. A power steering switch (P.C. switch) 110 is provided at an appropriate location and generates an ON signal when a hydraulic power steering mechanism (not shown) is in operation. A valve timing sensor 112 is provided in a hydraulic pressure circuit of the variable valve timing mechanism 50 and generates a signal indicating which characteristic is selected. A lift sensor 123 is provided in the vicinity of the EGR regulating valve 84 and generates a signal indicative of the lifting or stroke of the valve 86.

The signals generated by the sensors are forwarded to the ECU 86.

Figure 3:
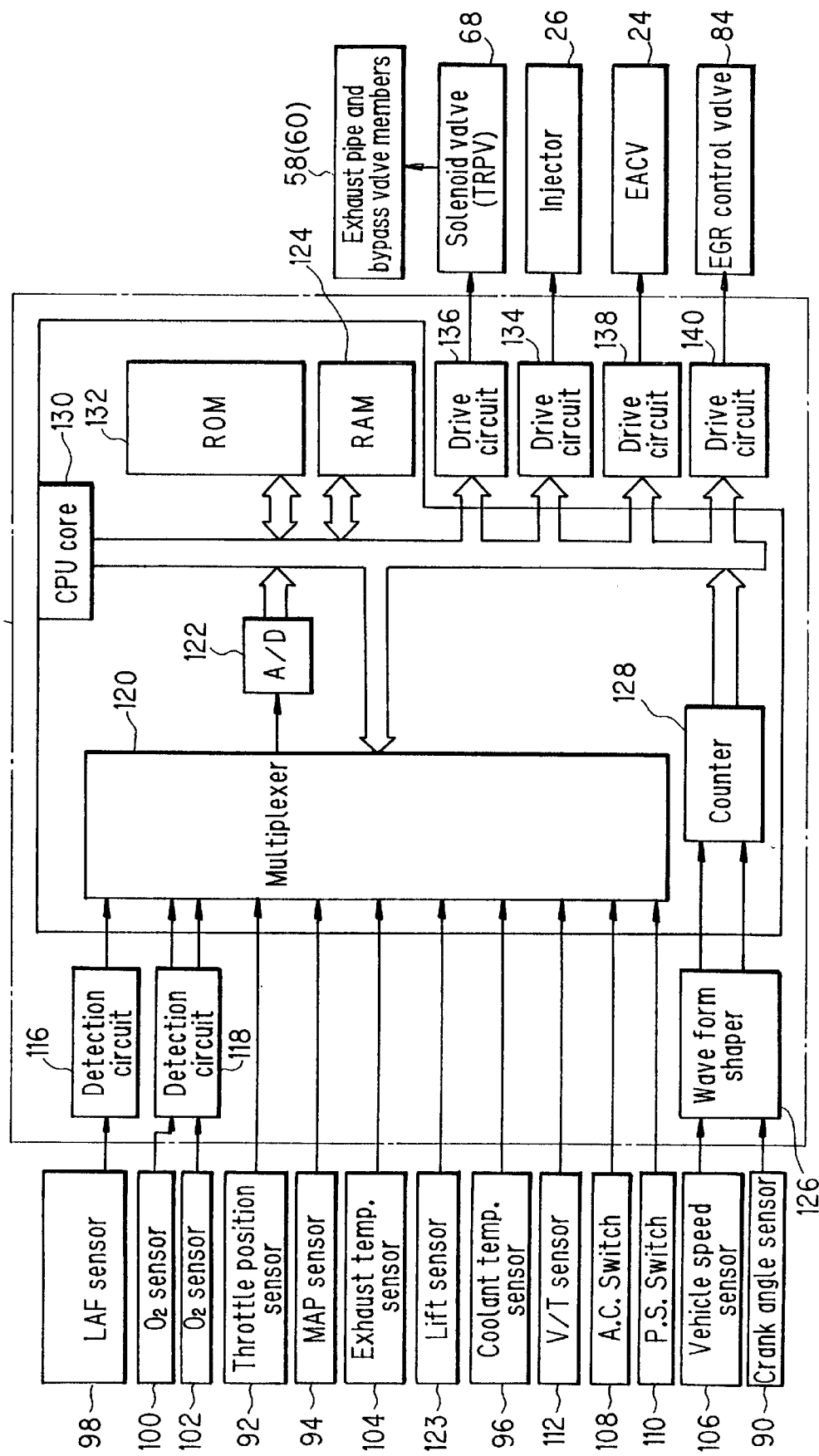
FIG. 3 is a block diagram showing the details of an electronic control unit (ECU) illustrated in FIG. 1.

Details of the ECU 86 are shown in the block diagram of FIG. 3.

The output of the LAF sensor 98 is received by a first detection circuit 116, where it is subjected to appropriate linearization processing for producing an output characterized in that it varies linearly with the oxygen concentration of the exhaust gas over a broad range extending from the lean side to the rich side. The outputs of the $O_2$ sensor 100, 102 are input to a second detection circuit 118 which generates a switching signal indicating that the air/fuel ratio in the exhaust gas emitted from the engine 10 is rich or lean with respect the stoichiometric air/fuel ratio.

The output of the first detection circuit 116 is forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the first detection circuit 116 is A/D-converted and stored in buffers of the RAM 124. Similarly, the output of the second detection circuit 118 and the analog outputs of the throttle position sensor 92, etc., are input to the CPU through the multiplexer 120 and the A/D converter 122 and stored in the RAM 124.

The output of the crank angle sensor 90 is shaped by a wave form shaper 126 and has its output value counted by a counter 128. The output of the count is input to the CPU and the engine speed Ne is detected from the count. In accordance with commands stored in the ROM 132, the CPU core 130 computes a manipulated variable and drives the fuel injectors 26 of the respective cylinders via a drive circuit 134. The CPU also drives the electromagnetic valve (TRPV) 68 via drive circuits 130 to open/close the exhaust pipe valve member 58 (and the bypass valve member 60) through the valve actuator 64, and drives the EACV 24 and the EGR regulating valve 84. The CPU calculates the ignition timing in a manner described later and sends a command to an ignition device through a drive circuit (neither shown).

The operation of the exhaust gas purification system of an internal combustion engine according to the invention will be explained with reference to the flow chart shown in FIG. 4. The program shown is executed once every TDC crank angular position.

The program begins at S10 in which it is determined whether the engine 10 is starting. This is done by checking whether the ignition switch is being activated (ON) or a starter motor (not shown) is in operation.

When the result in S10 is affirmative, the program proceeds to S12 in which a timer named TTRS (down counter) is set with a value TTRSLMT and is started to measure time lapse. The program proceeds to S14 in which TPRV (electromagnetic valve) 68 is turned ON to open the bypass valve member 60 through the valve actuator 64, and is terminated. Since the exhaust pipe valve member 58 is integrally connected to the valve member 60, the valve member closes the exhaust pipe 38. Since the valve operation utilizes the negative pressure, there is a slight delay until the negative pressure is generated in the air intake system after engine startup. However, the negative pressure will be generated almost immediately and causes the actuator 64 to operate.

Figure 5:
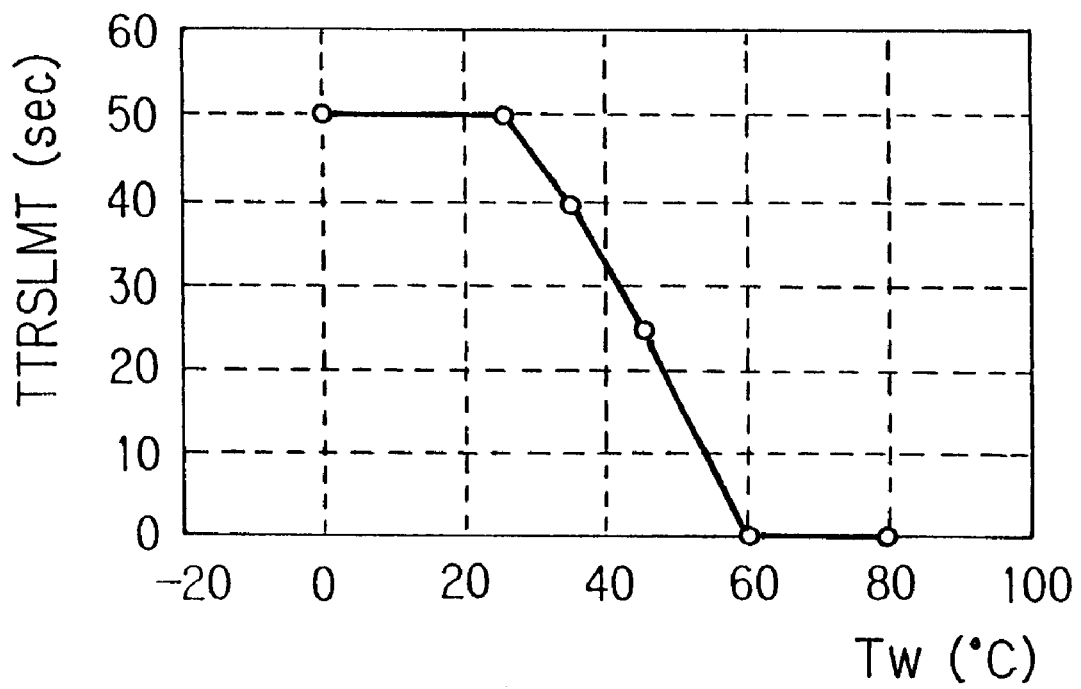
FIG. 5 is an explanatory graph showing the characteristic of a timer value referred to in the flow chart of FIG. 4.

The timer value TTRSLMT is a value corresponding to a period or time during which the bypass valve member 60 is kept open, i.e., a time during which the exhaust gas is led to flow through the adsorber 74 such that it adsorbs the unburnt HC component. The timer value is determined with reference to the coolant temperature Tw at engine startup and hence variable. FIG. 5 shows the characteristic of the timer value TTRSLMT set with respect to the coolant temperature Tw. Since the coolant temperature is proportional to the catalyst temperature under engine starting, the exhaust temperature TCAT may instead be used.

As illustrated in FIG. 5, the timer value TTRSLMT is set to be 50 sec. when the coolant temperature Tw is at or below 25° C. and is decreased with increasing coolant temperature. The timer value TTRSLMT is decreased to zero when the coolant temperature Tw rises to 60° C. This is because the HC adsorption is a substitute until the catalysts 40, 42, 44 have been activated. Moreover, causing the exhaust gas to flow the bypass 56 acts as a load to the engine. The period or time should therefore be as short as possible in view of engine torque. Since the coolant temperature rise indicates the catalysts will be activated soon, the counter value is set to be inversely proportional to the coolant temperature rise. When the coolant temperature is at or above 60° C., the engine is restarted immediately and is in a condition called "hot-restart". Since the catalysts are presumed to be held in the activated state, no adsorption is needed and hence, the timer value is set to be zero. When the result in S10 is negative, the program proceeds to S16 in which it is determined whether the value of the timer TURS has reached zero. When the result in S16 is negative, the program proceeds to S18 in which it is determined whether the engine 10 is under high load. As mentioned above, since closing the exhaust pipe 38 becomes a load for the engine 10, exhaust pipe closing should preferably be avoided when the engine load is high.

The determination whether the engine load is high is done by determining, partially or wholly, whether the vehicle speed is not more than a predetermined speed (e.g., 5 km/h), whether the throttle opening is not more than a predetermined position (e.g., closed position in engine idling), whether the engine speed is not more than 2000 rpm, whether the manifold absolute pressure is not more than a predetermined pressure, whether the air conditioner is in operation, whether the power steering mechanism is in operation, whether the characteristic for high engine speed is selected.

When the result in S18 is negative, the program proceeds to S20 in which the engine operation is under any failsafe condition, for example, it is in the condition that the air/fuel ratio feedback control is discontinued. This is because when the engine is not in the normal condition, if the unburnt HC component is adsorbed and is then recirculated to the air intake system, the air/fuel ratio might deviate from a desired value or misfiring might occur.

When the result in S20 is negative, the program proceeds to S14 in which the TPRV 68 is made ON to open the bypass valve member 60. When the valve member has already been open, it is kept open.

On the other hand, when the result is affirmative in any of S16, S18 and S20, the program proceeds to S22 in which the value of the timer TTRS is replaced by zero, and proceeds to S24 in which the TRPV 68 is turned OFF to close the bypass valve member 60 (in other words, the exhaust pipe valve member 58 is made open). When the program once proceeds to S22, the determination in S16 is affirmative and the program proceeds to S22, S24. Thus, when the engine load becomes high before the timer value has not reached zero, no more HC adsorption will take place.

Figure 4:
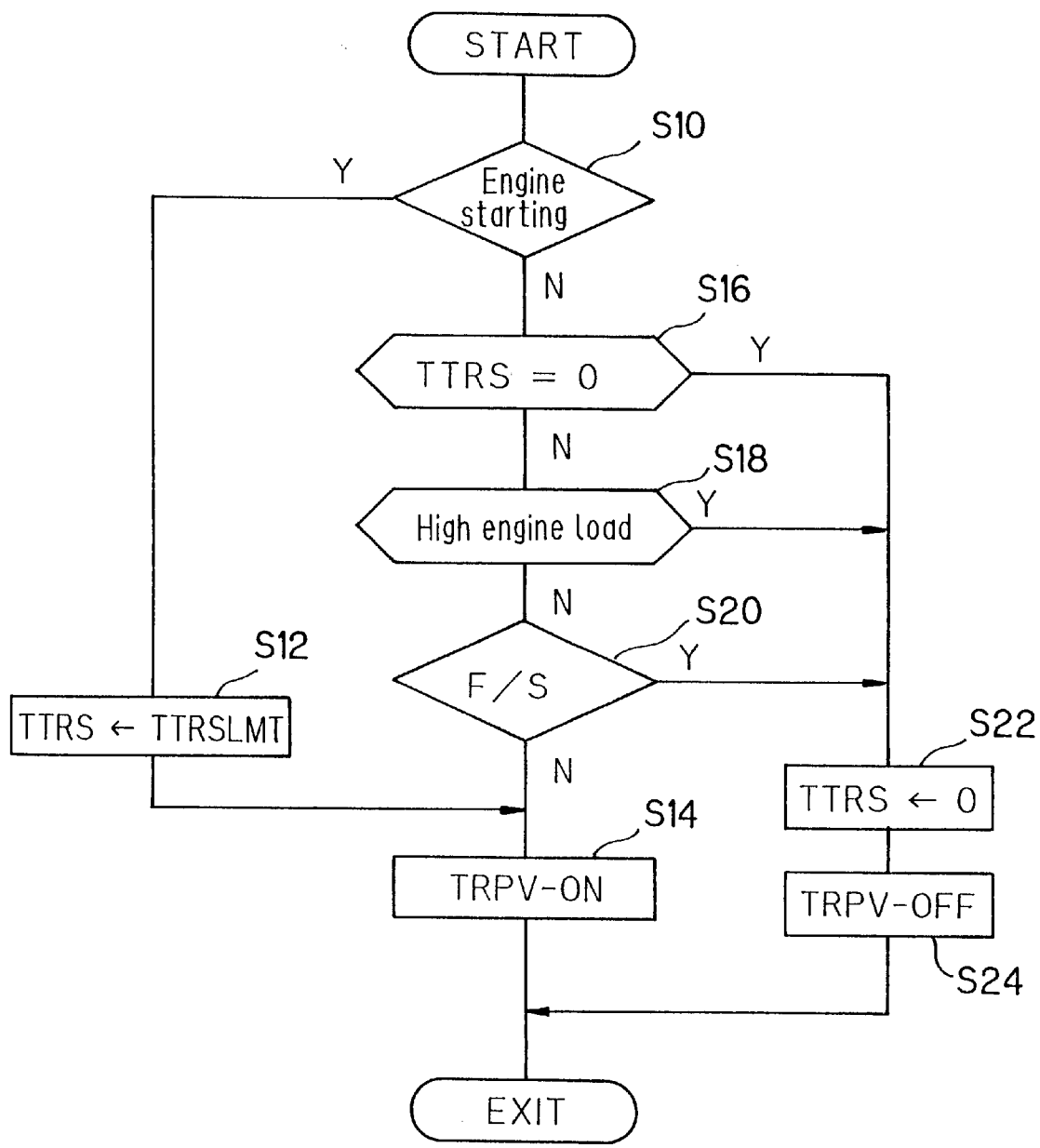
FIG. 4 is a flow chart showing the operation of the system illustrated in FIG. 1.
Figure 6:
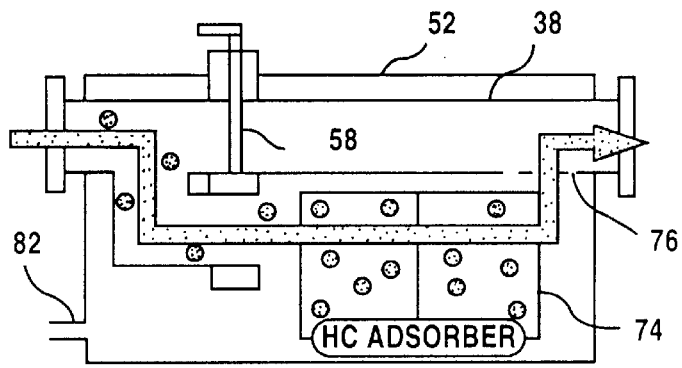
FIG. 6 is an explanatory view showing the operation of the system in which the adsorber adsorbs the unburnt HC component for a period after engine startup.
Figure 7:
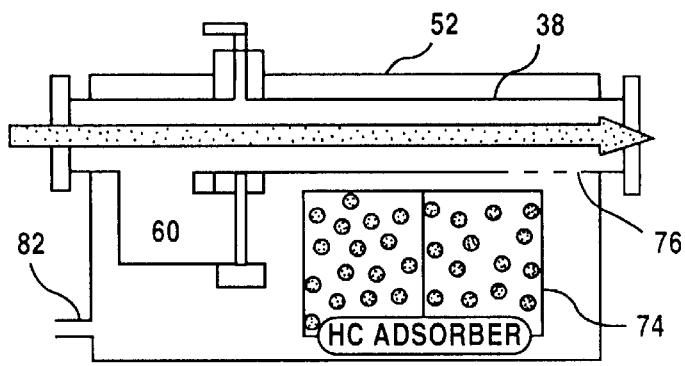
FIG. 7 is an explanatory view showing the operation of the system in which the adsorber retains the unburnt HC component.
Figure 8:
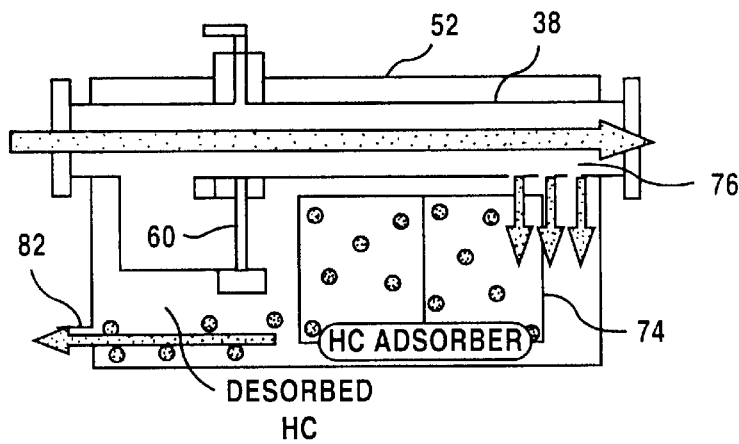
FIG. 8 is an explanatory view showing the operation of the system in which the adsorber adsorbs the unburnt HC component to the air intake system when the EGR control is effected.

FIGS. 6 to 8 illustrates the operation shown in the flow chart of FIG. 4.

Since the three catalysts 40, 42, 44 have not been activated at the time of engine starting, the exhaust pipe valve member 58 is closed, while the bypass valve member 60 is opened. As a result, the exhaust gas flows, via the chamber 52, to the bypass 56 and passes the space 72 and the adsorber 74, enters the exhaust pipe 38 and flows to the atmosphere via the vehicle rear assembly 46, as shown by a thick arrow illustrated in FIG. 6. At the time of engine starting, the quantity or amount of fuel injection is enriched and the ignition timing is retarded, producing an exhaust gas including an unburnt HC component. The adsorber 74 adsorbs a part of the unburnt HC component. For a clearer understanding, the unbumt HC component is represented by black dots.

The retarded ignition timing causes the engine 10 to exhaust the high temperature gas which causes the catalysts 40, 42, 44 to be activated and the adsorber to be heated. The HC component adsorption continues for the period TTRSLMT determined by the coolant temperature. The adsorption is thus kept to a minimum.

When the time TTRSLMT has lapsed, the catalysts would presumably be activated and the exhaust gas is ready for purification. Therefore, the bypass valve member 60 is closed and the exhaust pipe valve member 58 is opened. The exhaust gas flows only in the exhaust pipe 38 as shown by a thick arrow in FIG. 7. The HC component remains trapped by the adsorber 74. If the adsorber 74 adsorbs a part of the HC component, it remains within the space, since the exhaust gas pressure in the exhaust pipe 38 is relatively high.

Then, when the EGR is initiated under a predetermined engine operating condition as will be explained later, the exhaust gas flowing through the exhaust pipe is partially drawn by the negative pressure and passes through the holes 76 and flows to chamber space 72, and flows to the air intake pipe 12 through the EGR conduit 82, as shown in FIG. 8. The adsorber 74 heated by the exhaust gas is further heated by the part of exhaust gas flowing therethrough, which expedites the adsorbed unburnt HC component desorption. The unburnt HC component is thus purged to the air intake system.

As a result, the adsorber 74 adsorbs the component which is then recirculated to the air intake pipe 12 through the EGR conduit 82. As mentioned above, the adsorber 74 used in the embodiment adsorbs the component when the temperature of the adsorber is approximately at or below 100° C., and adsorbs it when the temperature of the adsorber is approximately 1000° C. to 250° C.

Since the recirculated exhaust gas including the unburnt HC component does not have oxygen, the $O_2$ sensor 102 installed in the EGR conduit 82 will show that the air/fuel ratio is richer than the stoichiometric air/fuel ratio. Accordingly, if the $O_2$ sensor 102 indicates that the air/fuel ratio there is richer than the stoichiometric air/fuel ratio, it can be presumed that there is a leak in the EGR conduit 82, etc., and air has entered the EGR conduit 82. Thus, a leakage can be detected by sensing the air/fuel ratio in the EGR conduit 82. Alternatively, when a temperature sensor, instead of the $O_2$ sensor, is provided in the EGR conduit 82, air entering from a leakage will drop the temperature of the recirculated exhaust gas, hence the trouble can also be detected.

Figure 9:
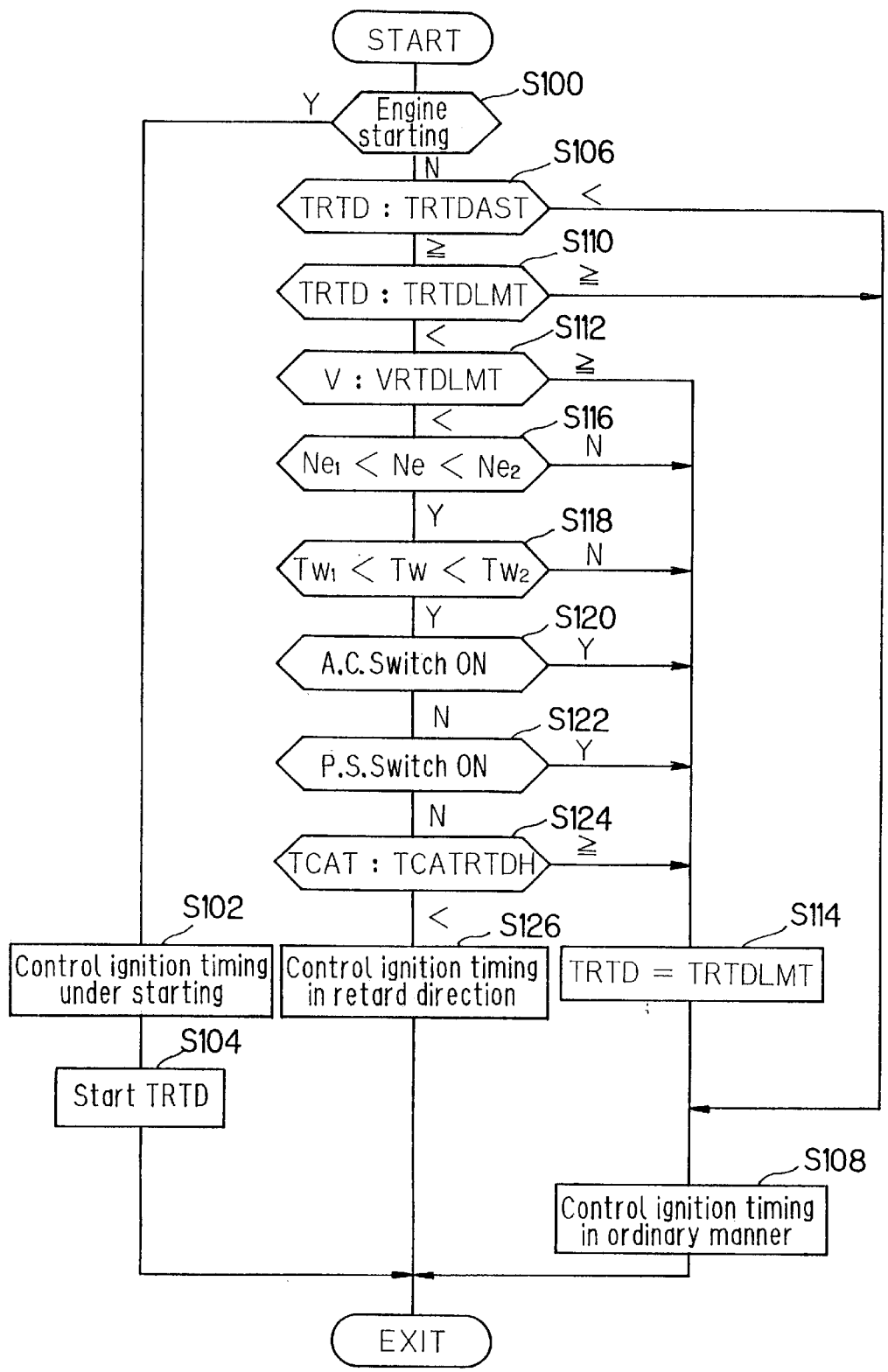
FIG. 9 is a flow chart showing the ignition timing control conducted for promoting the catalyst activation.

The retard ignition timing control for catalyst activation mentioned above will be explained with reference to the flow chart of FIG. 9.

The program begins at S100 in which it is determined whether the engine 10 is starting. This is done by using the manner described with reference to S10 in FIG. 4.

When the result in S100 is affirmative, the program proceeds to S102 in which the ignition timing is controlled in response to the characteristic prepared for engine starting. More specifically, the ignition timing is advanced. At the same time, the quantity of fuel injection is enriched. The program then proceeds to S104 in which a timer (up counter) TRTD is started to measure time lapse.

When the result in S100 is negative, the program proceeds to S106 in which it is determined whether a count (time) of the timer TRTD has reached a predetermined value (time) TRTDAST. The predetermined value TRTDAST corresponds to a time or period (e.g., 2 sec. after engine startup) during which the ignition timing retard is inhibited so that the engine combustion is stable. When it is determined in S106 that the timer value has not reached the predetermined value, the program proceeds to S108 in which the ignition timing is controlled in an usual manner. More specifically, the ignition timing is controlled in response to the detected engine speed and engine load (manifold absolute pressure). The fuel metering is controlled in a similar manner.

When it is determined in S106 that the timer value has reached the predetermined value, the program proceeds to S10 in which it is again determined whether the timer value TRTD has reached a predetermined second value TRTDLMT. The predetermined second value TRTDLMT defines a period or time at which the ignition timing retard should be terminated and is set to be e.g., 20 sec. When it is determined in S110 that the timer value has reached the predetermined second value, the program proceeds to S108.

On the other hand, when it is determined in S110 that the timer value has not reached the predetermined second value, the program proceeds to S112 in which it is determined whether the vehicle speed V is not less than a predetermined vehicle speed VRTDLMT. The value defines the vehicle speed beyond which no ignition timing should be made. This is because ignition timing retardation is not preferable during high engine load, similar to the determination made in S18 in FIG. 4. When it is determined in S112 that the vehicle speed is not less than the predetermined vehicle speed, the program proceeds to S114 in which the timer value is replaced with the predetermined second value TRTDLMT, and proceeds to S108. Therefore, once the timer value has been replaced in S114, it is always determined in S110 in the next or later program loop that the timer value is not less than the predetermined second value, the program proceeds to S108 and no ignition timing retard is conducted. Thus, the retard control is only carried out under low engine load for a period of 20 sec. beginning 2 sec. From the engine startup.

When it is determined in S112 that the vehicle speed is less than the predetermined vehicle speed, the program proceeds to S116 in which it is determined whether the engine speed Ne is above a lower engine speed Ne1 for inhibiting the ignition timing retard (e.g., 1000 rpm), but is below an upper engine speed Ne2 for similarly inhibiting the ignition timing retard (e.g., 2000 rpm). When the result is negative, the program proceeds to S114. The engine speed is controlled during idling to a desired speed such as 1500 rpm. When the engine speed is not within the range, the ignition timing retard would lower the engine output and should therefore be avoided.

When the result in S116 is affirmative, the program proceeds to S118 in which it is determined whether the coolant temperature Tw is above a lower coolant temperature Tw1 for inhibiting the ignition timing retard (e.g., 0° C.), but is below an upper coolant temperature Tw2 for similarly inhibiting the ignition timing retard (e.g., 90° C.). When the result is negative, the program proceeds to S114 for a similar reason.

When the result in S118 is affirmative, the program proceeds to S120 in which it is determined whether the air condition switch 108 is generating the ON signal, i.e., the air conditioner is in operation. When the result is affirmative, the program proceeds to S114. When the result in S118 is negative, the program proceeds to S122 in which it is determined whether the power steering switch 110 is generating the ON signal, i.e., the power steering mechanism is in operation. When the result is affirmative, the program proceeds to S114.

When the result in S122 is negative, the program proceeds to S124 in which it is determined whether the exhaust temperature TCAT (temperature in the exhaust system) is not less than a predetermined temperature TCATRTDH (e.g., 900° C.). When it is determined in S124 that the exhaust temperature is not less than the predetermined temperature, the program proceeds to S114. Since the ignition timing retard will raise the exhaust temperature, the retard should be avoided so as to prevent the three catalysts 40, 42, 44 from being damaged.

When it is determined in S124 that the exhaust temperature is less than the predetermined temperature, the program proceeds to S126 in which the ignition timing is controlled in the retarded direction so as to raise the temperature of the three catalysts. To be more specific, the EACV 24 is opened to increase the quantity or amount of intake air and the quantity of fuel injection is enriched in response to the air increase. The ignition timing is retarded more than usual to delay the combustion so as to exhaust the high temperature exhaust gas which heats the catalysts to promote their activation. More precisely, the ignition timing is controlled to a desired value set in the retard direction in a closed loop, while enriching the quantity or amounts of air and fuel, such that the engine speed converges to the desired speed (e.g., 1500 rpm).

The EGR control for the unburnt HC component desorption will now be explained.

In an ordinary EGR control, the gas recirculated is the burnt gas. In the air/fuel ratio or fuel metering control, the recirculated gas acts as a disturbance. In this embodiment, since the gas includes the unburnt fuel (HC component), the rate or amount of EGR should be estimated accurately and based on the estimated value, the quantity of fuel injection should be corrected. For that reason, the exhaust gas purification system in the embodiment is configured to have a controller expressed in a recursion formula, more precisely an STR (self-tuning regulator) in the adaptive controller. The adaptive controller (STR) calculates a feedback correction coefficient for correcting the quantity of fuel injection to be supplied to the engine 10 such that the detected air/fuel ratio converges to a desired air/fuel ratio. At the same time, other correction coefficients including an EGR correction coefficient are calculated.

The quantity of fuel injection is corrected by the feedback correction coefficient and the correction coefficients.

The calculation of the feedback correction coefficient using the adaptive controller will be explained. Since, however, the details of the calculation are described in U.S. Pat. No. 5,657,736 proposed by the assignee, this will be explained briefly.

Figure 10:
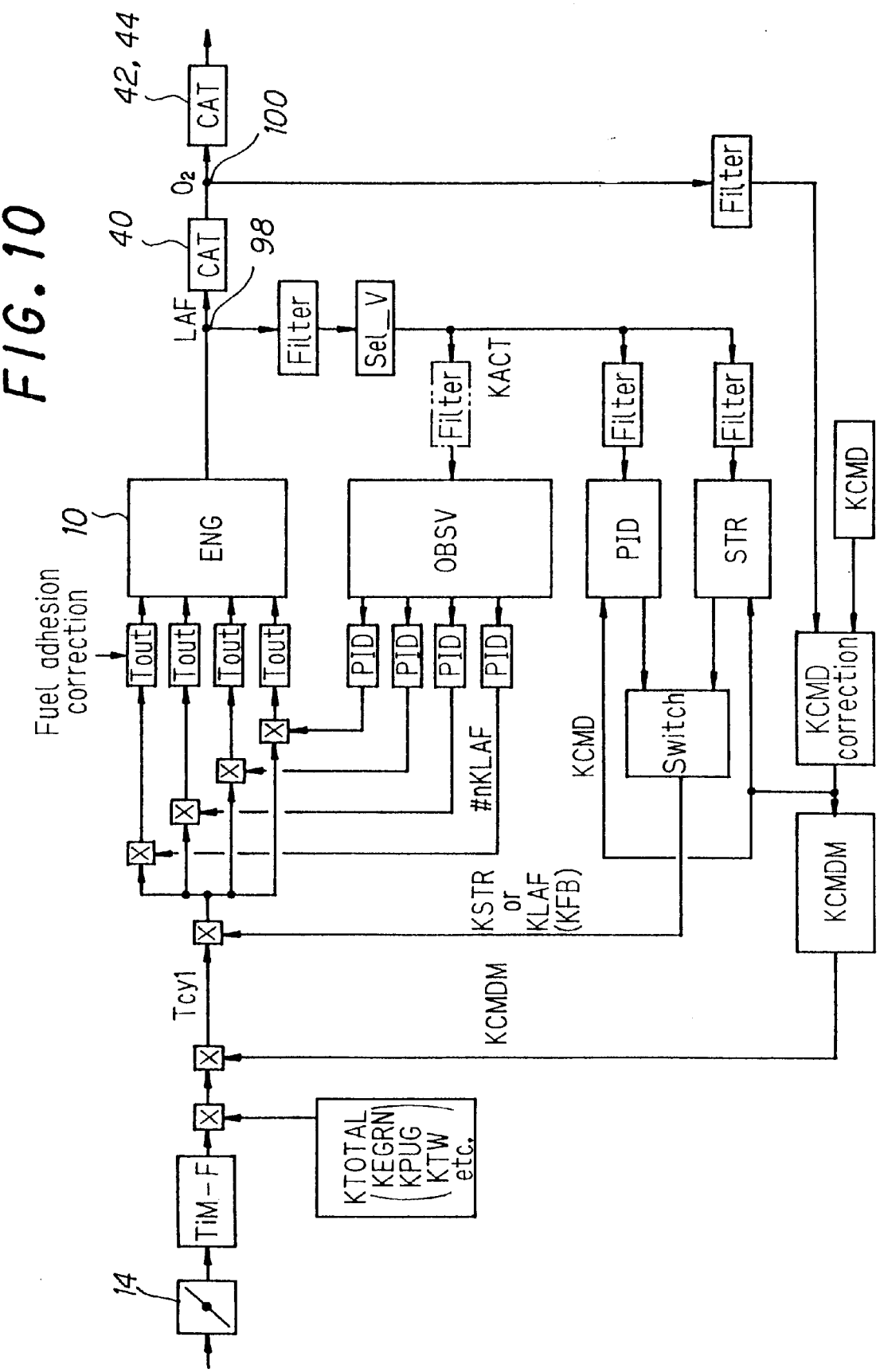
FIG. 10 is a block diagram showing the feedback loop having an adaptive controller which calculates a feedback correction coefficient based on which the EGR control is effected.

FIG. 10 is a block diagram illustrating the configuration of the system.

As illustrated, the system includes an observer (shown as "OBSV" in the figure) which estimates the air/fuel ratio (named KACT) of the four cylinders based on the output of the single LAF sensor 98 installed in the exhaust confluence point. The system includes the adaptive controller (shown as "STR" in the figure) which inputs KACT. The output of the $O_2$ sensor 100 is input to a desired air/fuel ratio correction block (shown as "KCMD correction") where a desired air/fuel ratio correction coefficient (named KCMDM) for correcting the desired air/fuel ratio (named KCMD) is determined in response to the error between KCMD and the $O_2$ sensor output.

On the other hand, the basic quantity of fuel injection (named TiM-F) is calculated and is multiplied by the total correction coefficient including the EGR correction coefficient KEGRN and by the desired air/fuel ratio correction coefficient KCMDM to determine the required quantity of fuel injection (named Tcyl).

The corrected desired air/fuel ratio KCMD is input to the adaptive controller STR and a PID controller (proportion-plus-integral-plus-derivative controller, shown as "PID") which calculate the feedback correction coefficients (named KSTR and KLAF, generally named KFB). The required quantity of fuel injection is multiplied (corrected) by KSTR to determine an output quantity of fuel injection (named Tout), which is then subject to the fuel adhesion correction and is finally supplied to the engine 10. When the engine 10 is in operating conditions such as having just returned from the fuel-cut operation, the other coefficient KLAF is used. The STR calculates the feedback correction coefficient KSTR such that KACT converges to KCMD.

Figure 11:
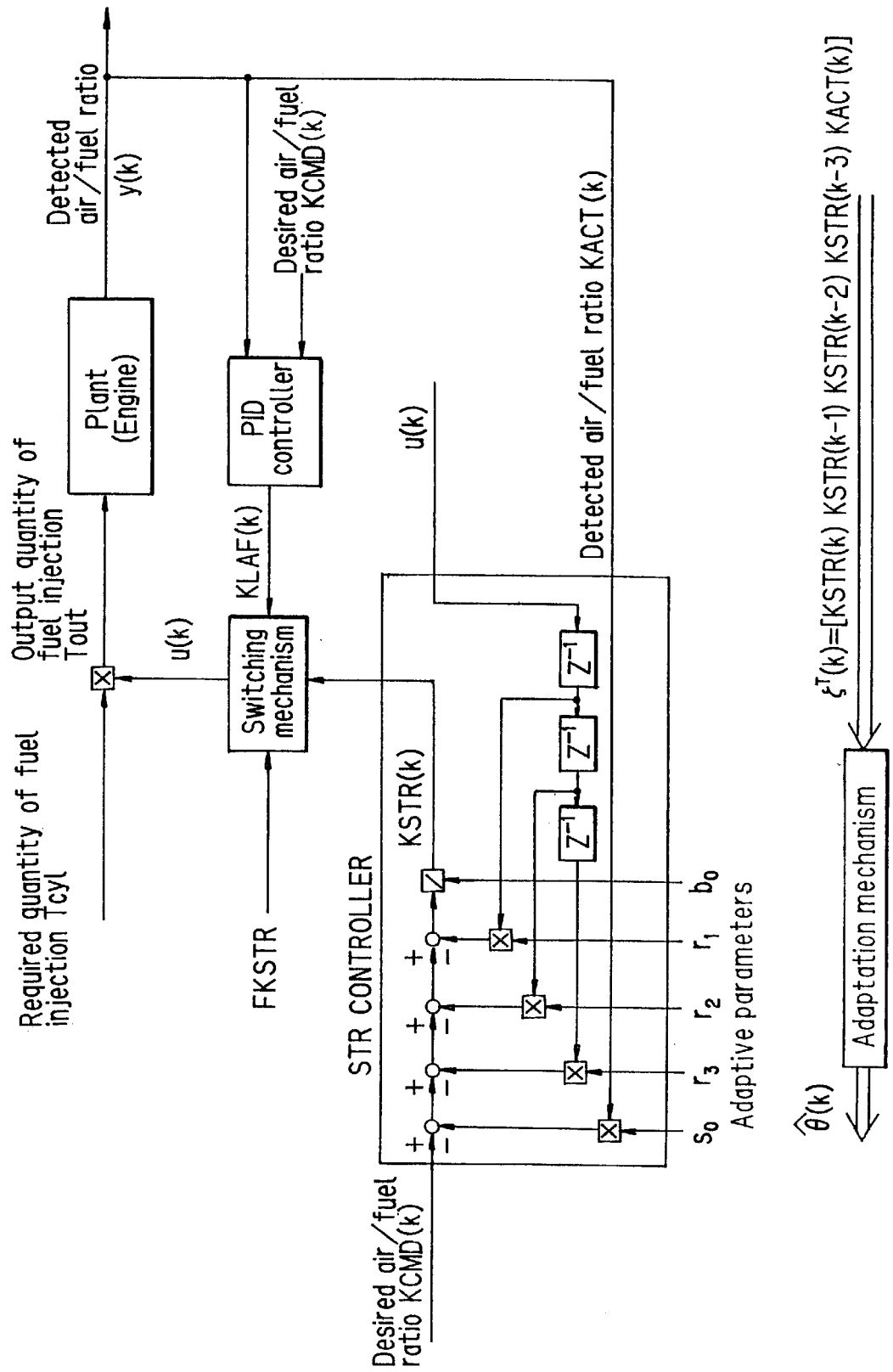
FIG. 11 is a block diagram showing the configuration of the adaptive controller shown in FIG. 10.

Explaining the calculation of the feedback correction coefficient KSTR with reference to FIG. 11, the STR controller (shown as "STR CONTROLLER" in this figure) includes an adaptation mechanism. The STR controller inputs the desired air/fuel ratio KCMD(k) and the controlled variable (detected air/fuel ratio) KACT(k) and calculates the feedback correction coefficient KSTR(k) using the control law expressed in a recursion formula, i.e. the adaptive parameters $\hat{\theta}(k)$ expressed in a vector (coefficient vector) estimated or identified by the adaptation mechanism.

More specifically, when the polynomial of the denominator and numerator of the transfer function $B(Z^{-1})/A(Z^{-1})$ of the controlled object (the engine 10) in discrete-time series is defined as Eqs. 1 and 2 below, the adaptive parameters $\hat{\theta}(k)$ estimated or identified by the adaptation mechanism are shown as Eq. 3 in a vector (transpose vector). Here, "k" is a sample number in the discrete-time series system. Intermediate value $\zeta(k)$ input to the adaptation mechanism is shown as Eq. 4. Here, there is taken as example a plant in which m=1, n=1 and d=3, i.e., the plant model is given in the form of a linear system with 3 control cycles of dead time.

$$A(Z^{-1}) = 1 + a_1 z^{-1} + \cdots + a_n z^{-n} \quad \text{Eq. 1}$$

$$B(Z^{-1}) = b_0 + b_1 z^{-1} + \cdots + b_m z^{-m} \quad \text{Eq. 2}$$

$$\hat{\theta}^T(k) = [\hat{b}_0(k), \hat{B}_R(z^{-1}, k), \hat{S}(z^{-1}, k)] \quad \text{Eq. 3}$$
$$= [\hat{b}_0(k), \hat{r}_1(k), \cdots, r_{m+d-1}(k), s_0(k), \cdots, s_{n-1}(k)]$$
$$= [b_0(k), r_1(k), r_2(k), r_3(k), s_0(k)]$$

$$\zeta^T(k) = [u(k), \cdots, u(k-m-d+1), y(k), \cdots, y(k-n+1)] \quad \text{Eq. 4}$$
$$= [u(k), u(k-1), u(k-2), u(k-3), y(k)]$$

In the above, the adaptive parameters $\hat{\theta}$ comprises the elements of a scalar quantity $\hat{b}_0^{-1}(k)$ that determines the gain, an element $\hat{B}_R(Z^{-1}, k)$ that is expressed by the manipulated variable and an element $\hat{S}(Z^{-1}, k)$.

The adaptation mechanism estimates or identifies these elements and outputs to the STR controller as the adaptive parameters $\hat{\theta}$ (shown in Eq. 3). Specifically, the adaptation mechanism calculates the adaptive parameters $\hat{\theta}$ using the manipulated variable u(i) input to the controlled object (plant) and the controlled variable y(j) output from the controlled object such that the error between the desired value and the controlled variable becomes zero. (Here, i, j include past values).

Specifically, the adaptive parameters $\hat{\theta}$ are calculated in accordance with an equation shown in Eq. 5 below.

$$\hat{\theta}(k) = \hat{\theta}(k-1) + \Gamma(k-1)\zeta(k-d)e^*(k) \quad \text{Eq. 5}$$

In Eq. 5, $\Gamma(k)$ is a gain matrix that is (m+n+d)th order square matrix and determines the estimation/identification speed of the adaptive parameters $\hat{\theta}$, and $e^*(k)$ is an error signal indicative of the generalized estimation/identification error, i.e., an estimation error signal of the adaptive parameters. The feedback correction coefficient KSTR(k) is calculated in accordance with an equation shown in Eq. 6.

$$KSTR(k) = \frac{KCMD(k-d') - s_0 \times y(k) - r_1 \times KSTR(k-1) - r_2 \times KSTR(k-2) - r_3 \times KSTR(k-3)}{b_0} \quad \text{Eq. 6}$$

Based on the above, the calculation or determination of the EGR correction coefficient KEGRN will be explained. Since, however, this is also described in U.S. Pat. No. 5,657,736, the description will be short.

First, the EGR rate is estimated. The rate is defined as a ratio in volume or weight of the exhaust gas relative to the intake air.

It can be assumed that the amount of gas passing through the EGR control valve 84 is determined from the valve opening area (the amount of valve lifting) and the ratio between the upstream pressure and downstream pressure of the valve 84. It can also be assumed that the EGR rate under a steady-state is a value when the amount of actual valve lifting is equal to the valve lifting command value, while the EGR rate under transient-state is a value when the amount of actual valve lifting is not equal to the valve lifting command value.

Thus, it is assumed to be possible to estimate the EGR rate (more precisely, the net EGR rate supplied to the engine cylinder) by multiplying the steady-state EGR rate by the ratio between the gas flow rates under the steady-state and the transient-state as:

net EGR rate=(steady-state EGR rate)×{ (gas flow rate QACT determined by actual valve lifting amount and the ratio between upstream pressure and downstream pressure of the valve)/(gas flow rate QCMD determined by command value and the ratio between upstream pressure and downstream pressure of the valve)}

Here, the steady-state EGR rate is calculated by determining a correction coefficient under a steady-state and subtracting the same from 1.0. Namely, calling the correction coefficient under a steady-state KEGRMAP, the steady-state EGR rate can be calculated as follows.

Steady-state EGR rate=(1−KEGRMAP)

The steady-state EGR rate and the correction coefficient under a steady-state are sometimes referred to as the "basic EGR rate" and "basic correction coefficient", respectively. In addition, as mentioned before, in order to distinguish from the EGR rate under a steady state, the EGR rate is sometimes referred to as the "net EGR rate".

The EGR control is conducted by determining a command value of the EGR control valve lifting amount on the basis of the engine speed and engine load, etc., and the actual behavior of the EGR control valve lags behind the issued command value. There is a response delay between the actual valve lifting and issuing the command value to do so. Moreover, it takes additional time for the exhaust gas passing through the valve to enter the combustion chamber. Therefore, it is assumed that the exhaust gas passing through the valve remains for a while in a space (chamber) before the combustion chamber and after a pause, i.e., the dead time, will enter the combustion chamber at one time. Accordingly, the net EGR rate is consecutively estimated and is stored in the memory each time the program is activated. Among the stored net EGR rates, one estimated at a previous control cycle corresponding to the delay time is selected and is deemed to be the true net EGR rate.

Figure 12:
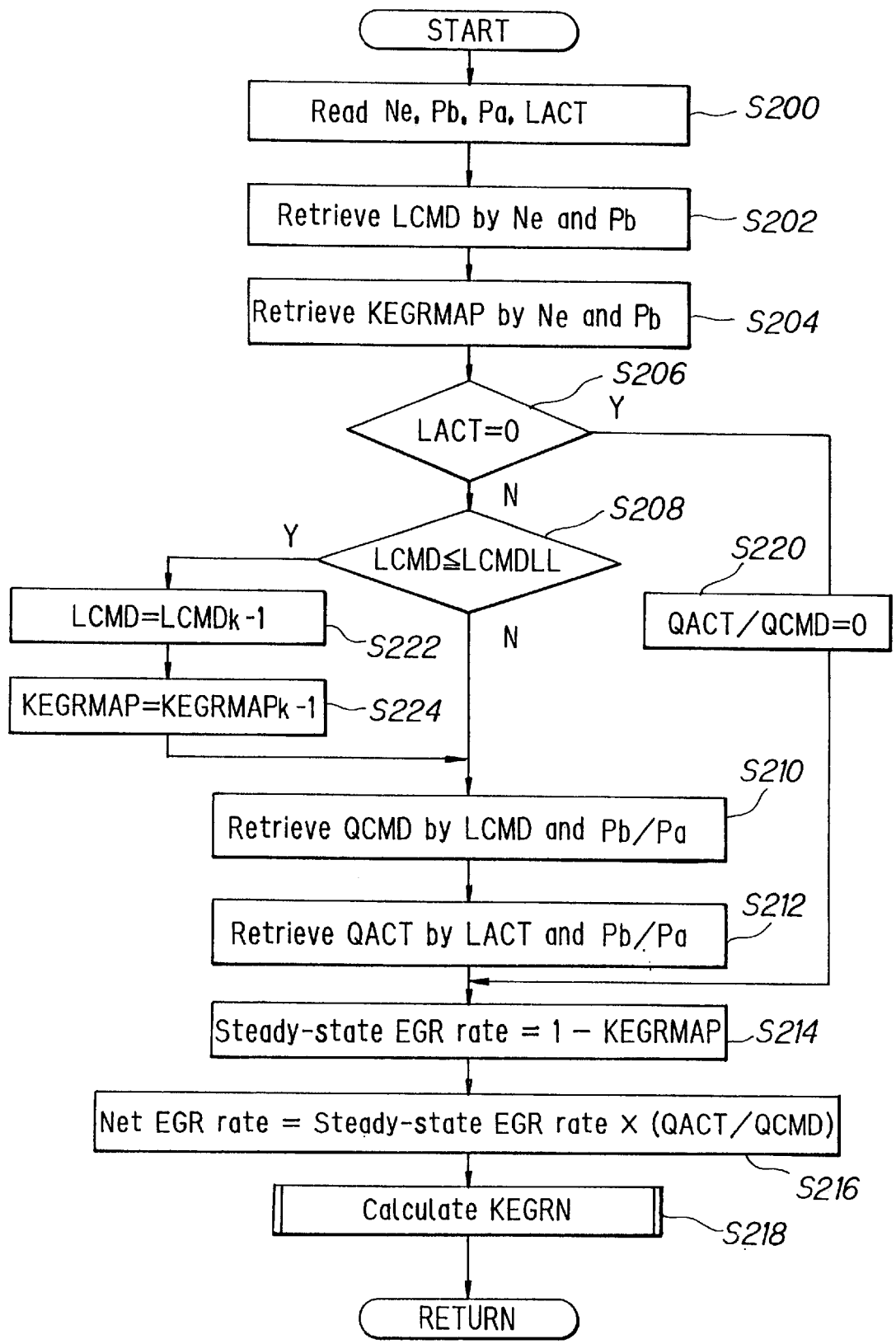
FIG. 12 is a main flow chart showing the EGR control.

The above will be explained with reference to the flow chart of FIG. 12. The program is activated at every TDC crank angular position.

The program begins at S200 in which the engine speed Ne, the manifold pressure Pb, the atmospheric pressure Pa, and the actual valve lifting amount named LACT (the stroke of the valve 84 detected by the sensor 123) are read, and proceeds to S202 in which the command value for valve lifting amount LCMD is retrieved from mapped data using the engine speed Ne and the manifold pressure Pb as address data. Like the aforesaid correction coefficient, the mapped data for the command value LCMD is predetermined with respect to the same parameters. The program then moves to S204 in which the basic EGR rate correction coefficient KEGRMAP is retrieved from the mapped data at least using the engine speed Ne and the manifold pressure Pb.

The program then advances to S206 in which it is confirmed that the actual valve lifting amount LACT is not zero, namely it is confirmed that the EGR control valve 84 is opened, and to S208 in which the retrieved command value LCMD is compared with a predetermined lower limit LCMDLL (a least value) to determine whether the retrieved command value is less than the lower limit. When S208 finds that the retrieved command value is not less than the lower limit, the program proceeds to S210 in which the ratio Pb/Pa between the manifold pressure Pb and the atmospheric pressure Pa is calculated and using the calculated ratio and the retrieved command value LCMD, the gas flow rate QCMD corresponding thereto is retrieved from mapped data which has been prepared in advance. The gas flow rate is that mentioned in the equation as "gas flow rate QCMD determined by the command value and the ratio between upstream pressure and downstream pressure of the valve".

The program then proceeds to S212 in which the gas flow rate QACT is retrieved from mapped data prepared in advance. This corresponds to the term in the equation "gas flow rate QACT determined by actual valve lifting amount and the ratio between upstream pressure and downstream pressure of the valve". The program then proceeds to S214 in which the retrieved EGR rate correction coefficient KEGRMAP is subtracted from 1.0 and the difference resulting therefrom is deemed as the steady-state EGR rate (basic EGR rate or steady-state EGR rate). The steady-state EGR rate means the EGR rate under which EGR operation is in a stable state, i.e., the EGR operation is not under a transient condition, such as when the operation is being started or terminated.

The program then moves to S216 in which the net exhaust gas recirculation rate is calculated by multiplying the steady-state EGR rate by the ratio QACT/QCMD, and to S218 in which a fuel injection correction coefficient KEGRN is calculated.

Figure 13:
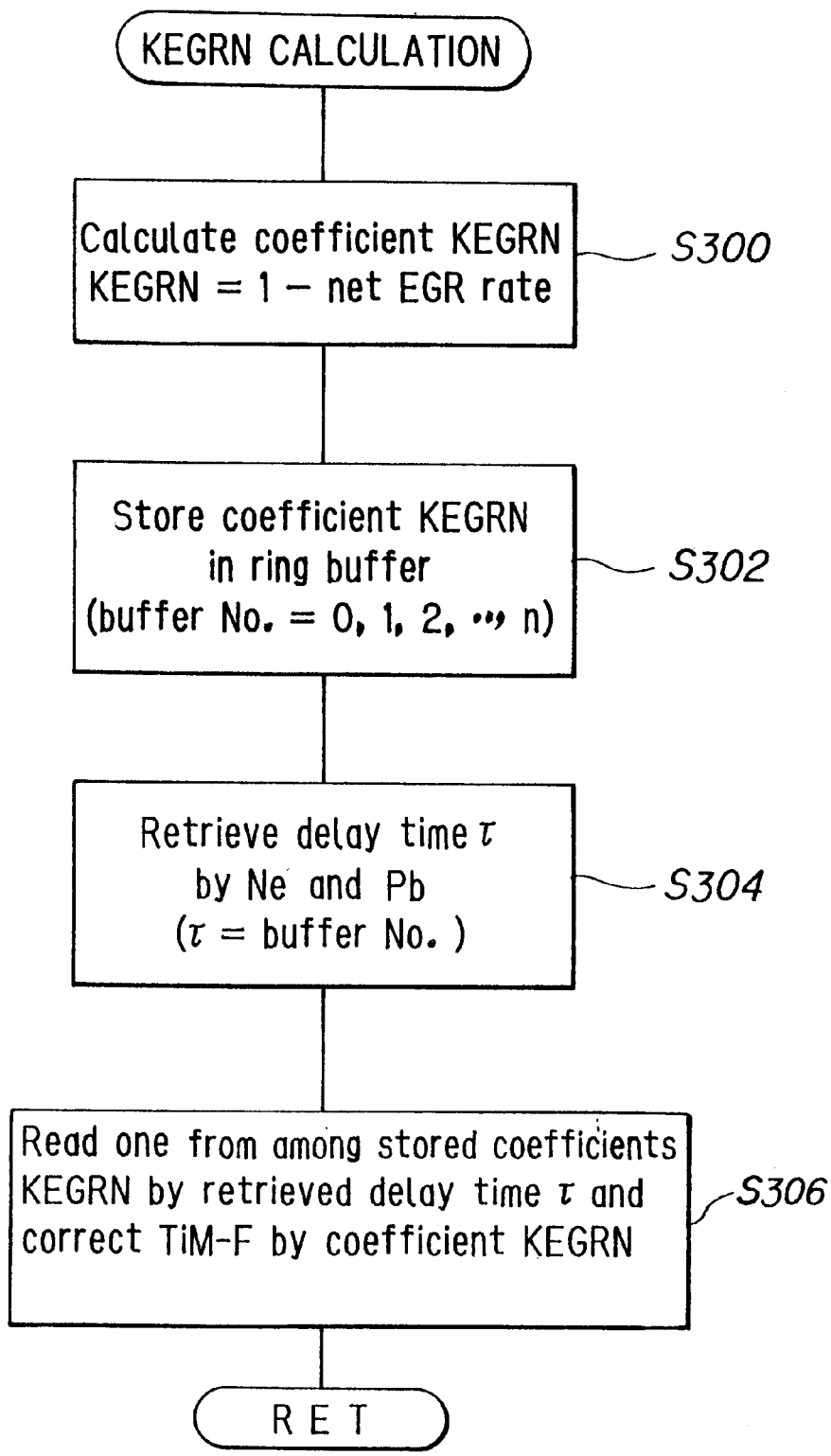
FIG. 13 is a subroutine of the flow chart of FIG. 12 showing the calculation of KEGRN referred to in FIG. 12.

FIG. 13 is a flow chart showing the subroutine for calculating the coefficient KEGRN.

In S300 in the flow chart, the net EGR rate (that is obtained at S216 of FIG. 12) is subtracted from 1.0 and the difference resulting therefrom is deemed to be the fuel injection correction coefficient KEGRN. The program then proceeds to S302 in which the calculated coefficient KEGRN is stored in a ring buffer prepared in the ROM 84.

FIG. 14 shows the configuration of the ring buffer. As illustrated, the ring buffer has n addresses which are numbered from 1 to n and are so identified. Each time the programs of the flow charts of FIGS. 12 and 13 are activated at respective TDC positions and the fuel injection correction coefficient KEGRN is calculated, the calculated coefficient KEGRN is consecutively stored in the ring buffer from the top.

In the flow chart of FIG. 13, the program then proceeds to S304 in which the delay time τ is retrieved from mapped data using the engine speed Ne and the engine load with the manifold pressure Pb as address data. FIG. 15 shows the characteristics of the mapped data. Namely, the delay time τ indicates a dead time during which the gas passing through the valve remains in the space before the combustion chamber. Since the dead time varies with engine operating conditions including the engine speed and the engine load, the delay time is set to vary with the parameters. Here, the delay time τ is set as the ring buffer number.

Figure 16:
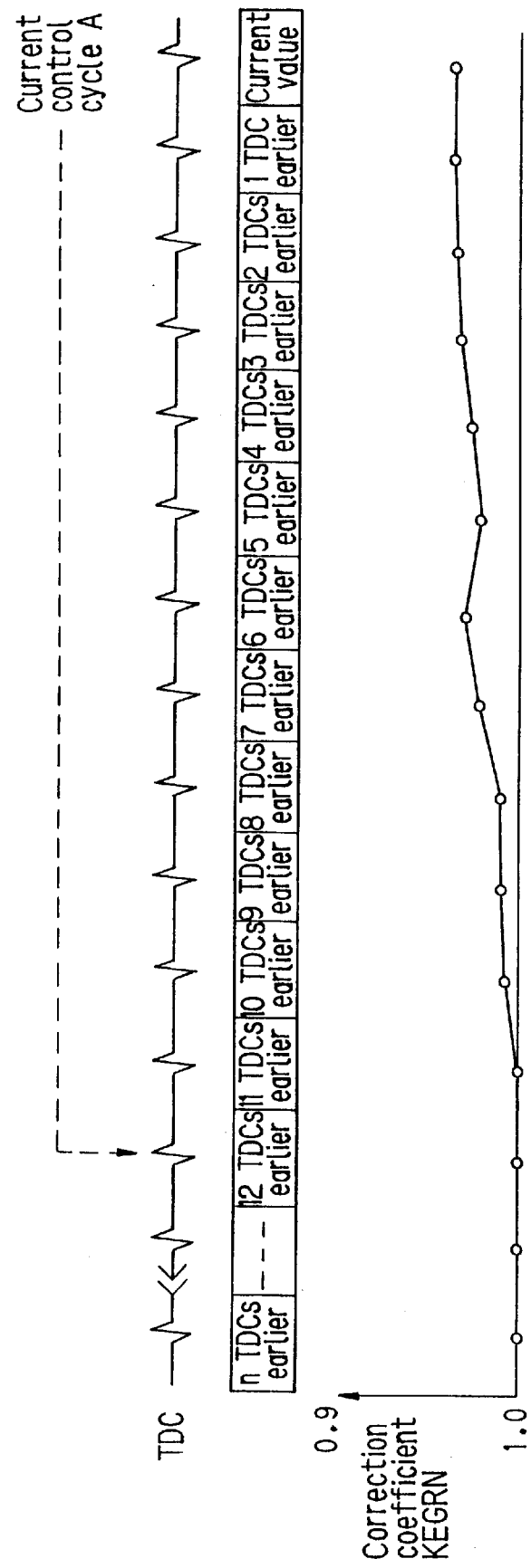
FIG. 16 is a time chart showing the operation of the flow chart of FIG. 13.

The program then moves to S306 in which one from among the stored fuel injection correction coefficients KEGRN corresponding to the retrieved delay time τ (ring buffer number) is read and is determined to be the correction coefficient KEGRN at the current control cycle. Explaining this in reference to FIG. 16, when the current control cycle (or period) is at A, the coefficient calculated 12 control cycles earlier is, for example, selected as the coefficient to be used in the current control cycle.

Again returning to FIG. 12, when S206 finds that the actual valve lifting amount LACT is zero, this means that no EGR operation is carried out. However, as the correction coefficient KEGRN at this time will be a candidate at the selection in a later control cycle, the program proceeds to S214 and on to calculate the net EGR rate and the correction coefficient KEGRN. In such a case, specifically, the net EGR rate is calculated as 0 at S216 and the fuel injection correction coefficient KEGRN is calculated as 1.0 at S300 in FIG. 13.

When it is found in S208 that the command value for valve lifting amount LCMD is less than the lower limit LCMDLL, the program proceeds to S222 in which the command value LCMDk−1 from the last control cycle k−1 is used.

This is because, when the command value for valve lifting amount LCMD is made zero in order to terminate the EGR operation, the actual valve lifting amount LACT does not immediately become zero due to the delay in valve response. Therefore, when the command value LCMD is less than the lower limit, the previous value LCMDk−1 is kept until S206 finds that the actual valve lifting amount LACT has become zero.

Moreover, when the command value LCMD is less than the lower limit LCMDLL, the command value may occasionally be zero. If this happens, the gas flow rate QCMD retrieved at S210 becomes zero and as a result, division by zero would occur at the calculation in step S216, making the calculation impossible. Since, however, the previous value is kept in S222, the calculation can be successfully carried out in S216.

The program then proceeds to S224 in which the basic correction coefficient KEGRMAPk−1 retrieved at the last control cycle is again used in the current control cycle. This is because, under such engine operating conditions that the command value LCMD retrieved in S202 is found to be less than the lower limit LCMDLL, the basic EGR rate correction coefficient KEGRMAP retrieved in step S14 will be 1.0 based on the characteristics of the mapped data. As a result, there is the possibility that the steady-state EGR rate is determined to be 0 in S204. The retaining of the last value in S224 aims to avoid this.

The EGR correction coefficient KEGRN is included in KTOTAL as mentioned above with reference to FIG. 10 and is used to determine the quantity of fuel injection. Since the air/fuel ratio is accurately converged to the desired value using the correction coefficient in response to the EGR rate and the correction coefficient determined by the adaptive controller, it becomes possible to recirculate the unburnt HC component to the air intake system at any time during the EGR operation, thereby improving the purification efficiency of the system.

With the arrangement, the system can effectively prevent the exhaust pipe from being clogged even when a valve for closing a bypass is stuck in the closed position, and can provide a relatively short EGR conduit for recirculating unburnt HC component adsorbed from the adsorber. Also, the adsorption and desorption are conducted optimally.

Figure 17:
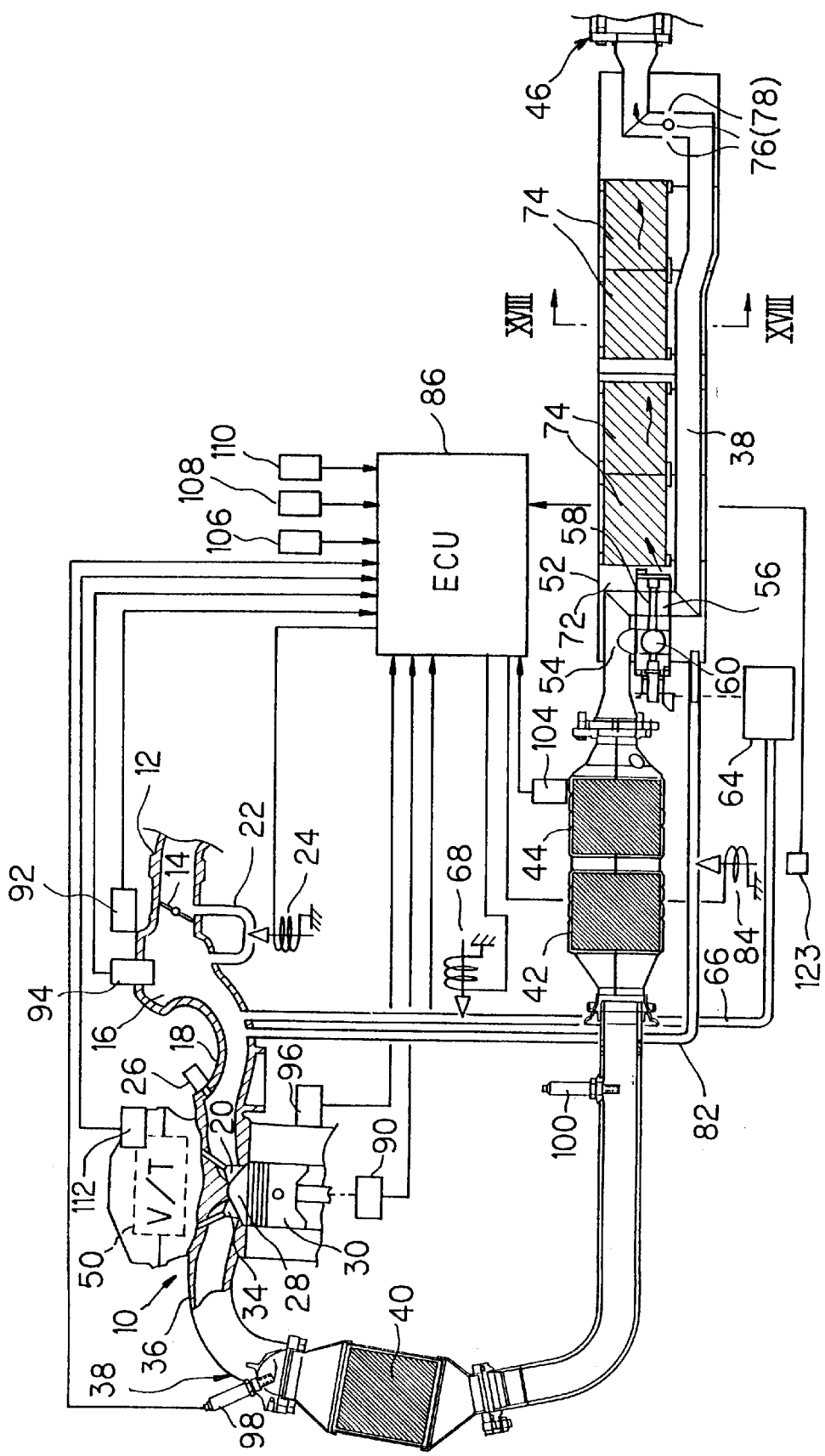
FIG. 17 is a view, similar to FIG. 1, but showing an exhaust gas purification system according to a second embodiment of the present invention.

FIG. 17 is a view, similar to FIG. 1, but shows the exhaust gas purification system of an internal combustion engine according to a second embodiment of the invention.

Explaining the system according to the second embodiment, the chamber 52 is elongated compared to the one of the first embodiment, and the adsorber 74 is carried on four beds and is housed in the chamber 52. In the second embodiment, thus, the amount of adsorber 74 is increased and hence, the capacity to adsorb the HC component is increased. In the second embodiment and thereafter, the same reference numeral indicates the same member in the first embodiment.

Figure 18:
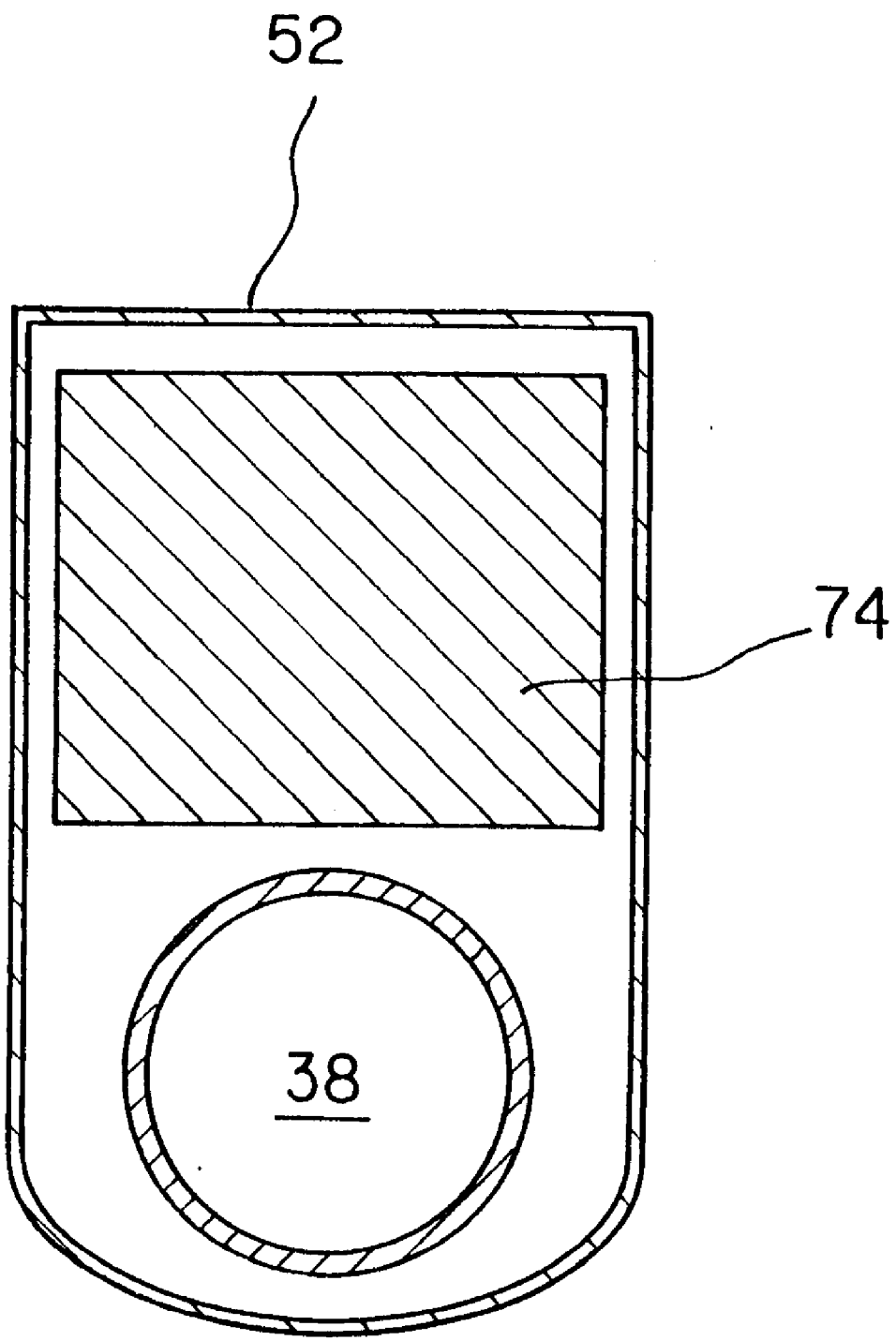
FIG. 18 is a cross-sectional view taken along the line of XVIII—XVIII of FIG. 17.

FIG. 18 is a cross-sectional view taken along XVIII—XVIII of FIG. 17. As illustrated, the chamber 52 is almost rectangular in cross section. The adsorber 74 is positioned, not around the exhaust pipe 38, but is situated close to the exhaust pipe 38 so as to receive heat that will expedite the desorption.

In the second embodiment, the exhaust gas flows, as indicated by arrows in FIG. 17, to the bypass 56 when the bypass valve member 60 is opened and the exhaust pipe valve member 58 is closed. Except for the fact that the amount of adsorber 74 is increased and hence, the capacity to adsorb the unburnt HC component is increased, the configuration, the operation, as well as the advantages are the same as that of the first embodiment.

Figure 19:
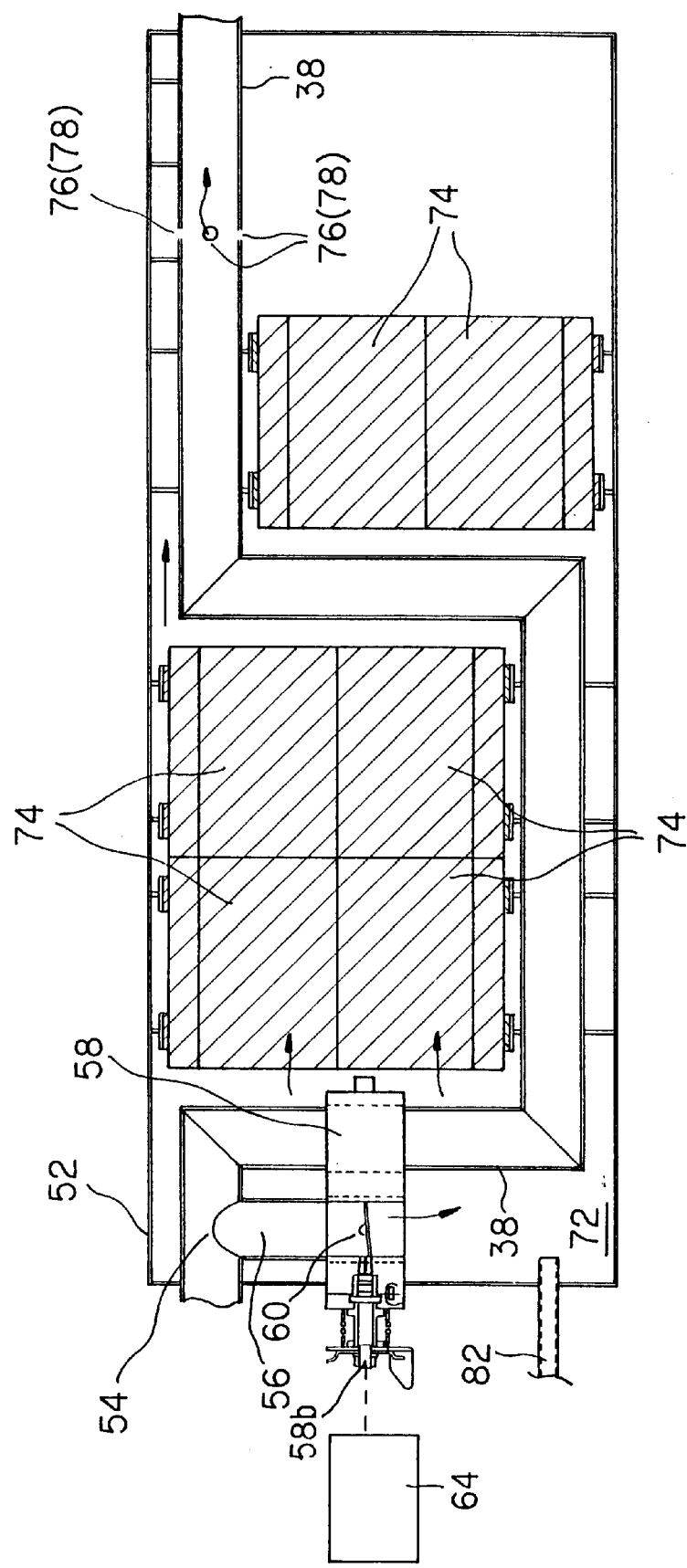
FIG. 19 is a cross-sectional plan view of an exhaust pipe showing an exhaust gas purification system according to a third embodiment of the invention.

FIG. 19 is a partial cross-sectional plan view of the exhaust pipe 38 schematically showing the exhaust gas purification system according to a third embodiment of the invention.

Explaining this while putting an emphasis on the difference from the foregoing embodiments, the chamber 52 is further enlarged to house the adsorber 74 carried on six beds (which is illustrated schematically for ease of understanding). In the third embodiment, the exhaust pipe 38 is staggered in the chamber 52 such that the adsorber 74 are housed or held in the recess or curved portion (viewing from the top) so as to expedite heating. In the third embodiment, the exhaust gas flows to the bypass 56 as shown by arrows in the figure when the bypass valve member 60 is opened while the exhaust pipe valve 58 is closed. Except for the fact that the amount of adsorber 74 is further increased and hence, the capacity to adsorb the unburnt of HC component is further increased, the configuration, the operation, as well as the advantages are the same as that of the first embodiment.

Figure 20:
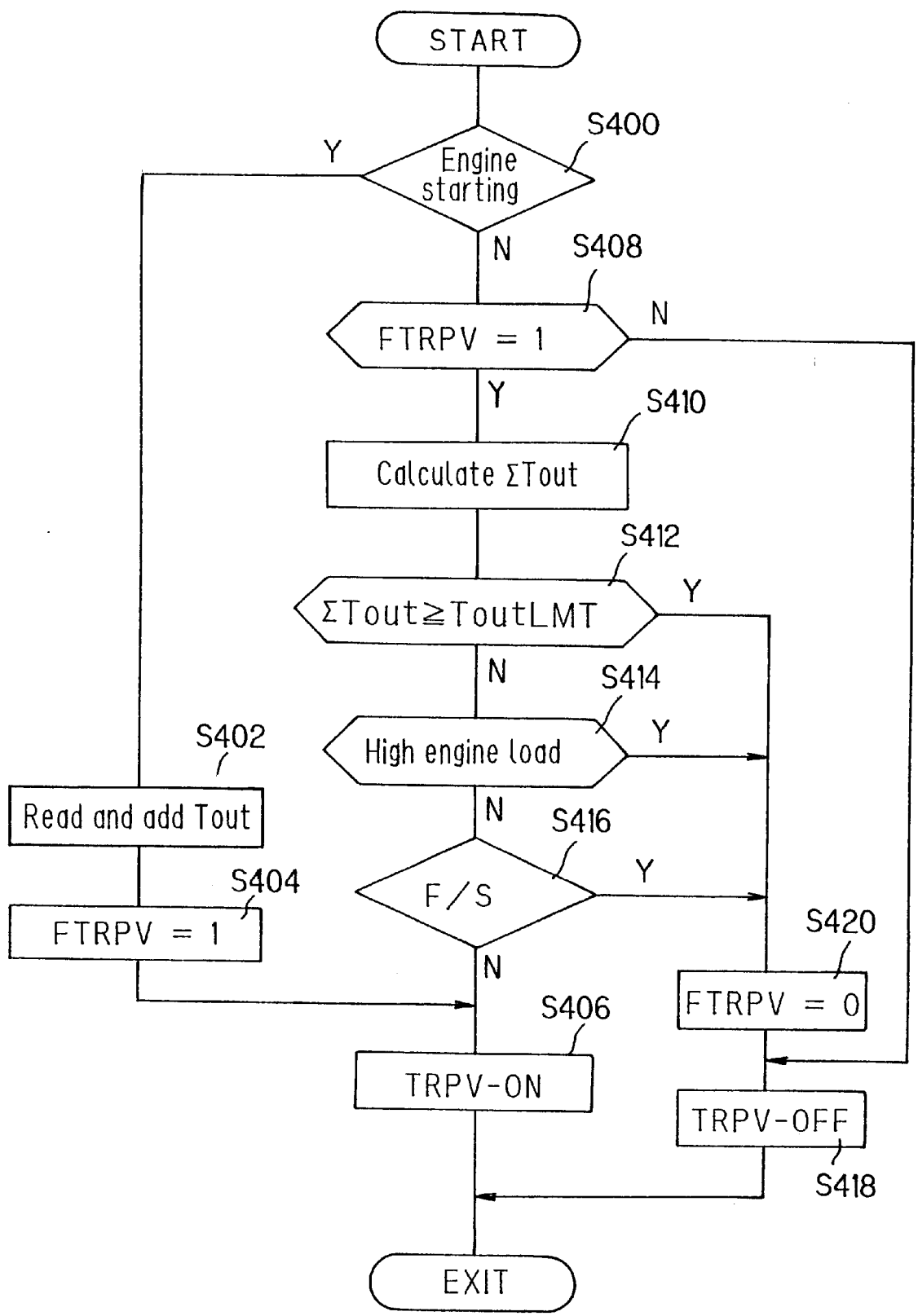
FIG. 20 is a view, similar to FIG. 4, but showing the operation of an exhaust gas purification system according to a fourth embodiment of the invention.

FIG. 20 is a view, similar to FIG. 4, but showing the exhaust gas purification system of an internal combustion engine according to a fourth embodiment of the invention.

In the fourth embodiment, a time or period for opening the bypass valve member 60 during engine starting is determined in accordance with a parameter relating to the volume or amount of exhaust gas.

Explaining the flow chart, the program begins at S400 in which it is determined whether the engine is starting using the manner mentioned above. When the result is affirmative, the program proceeds to S402 in which the output quantity of fuel injection Tout (mentioned with reference to FIGS. 10 and 11) is read, to S404 in which the bit of a flag FTRPV is set to 1, to S406 in which TPRV 68 is made ON to open the bypass valve member 60, and is terminated.

In a next loop, when the result is again affirmative, the program again proceeds to S402 in which Tout is newly read and is added to the value read in the preceding program loop, to S404 and S406 in which the flag bit is kept to 1 and the valve is kept opened (if not, it is set to 1 or opened), and is terminated. In the flow chart, setting the flag bit to 1 indicates reading and adding of Tout and making the valve 68 ON, while resetting the flag bit to 0 indicates discontinuation or termination thereof.

When the result in S400 is negative in the next or later loop, the program proceeds to S408 in which it is determined whether the flag bit is set to 1. When the result is affirmative, the program proceeds to S410 in which an accumulated value ΣTout of the read output quantity of fuel Tout is calculated. The accumulated value is thus a value accumulated since engine starting (since the flag bit was set to 1).

The program proceeds to S412 in which it is determined whether the accumulated value ΣTout is not less than a predetermined value ToutLMT. ToutLMT is a value corresponding to an upper limit of an accumulated volume or amount of exhaust gas. In the fourth embodiment, the limit of adsorption is determined based on a parameter relating to the volume or amount of exhaust gas (i.e., the accumulated value of the quantity of fuel injection). This is contrast to the first embodiment in which the limit of adsorption is determined based on a parameter relating to the catalyst temperature (i.e., the coolant temperature Tw).

The reason why the accumulated value of the quantity of fuel injection Tout is used as the parameter relating to the volume or amount of exhaust gas, is that, since the quantity of fuel injection Tout is determined such that the air/fuel ratio with respect to the quantity or amount of intake air becomes a predetermined air/fuel ratio (in the embodiment, the stoichiometric air/fuel ratio) and since the quantity or amount of intake air is proportional to the volume or amount of exhaust gas, the accumulated value of the quantity of fuel injection is equivalent to the accumulated value of the volume or amount of exhaust gas. If the desired air/fuel ratio KCMD is changed, the accumulated quantity of fuel injection should be corrected in response to the change of the desired air/fuel ratio.

The upper limit ToutLMT is determined on the basis of the adsorption ability of the adsorber 74, more precisely is determined on the basis of the critical adsorption ability and the volume or amount of the adsorber 74. The critical capacity that the adsorber 74 can adsorb the unburnt HC component is decided, irrespective of the temperature, from its mechanical and chemical limits. The upper limit ToutLMT is a value corresponding to this critical capacity.

Again explaining the flow chart of FIG. 20, when the result in S412 is negative, in other words, when it is determined that the accumulated value has not reached the upper limit, the program proceeds to S414 in which it is determined whether the engine load is high using the same manner mentioned in the first embodiment. When the result in S414 is negative, the program proceeds to S416 in which it is determined whether it is in any failsafe condition as done in the first embodiment. When the result in S416 is negative, the program proceeds to S406 in which the TRPV 68 is made ON or kept ON if it has previously been made ON.

On the other hand, when the result in S408 is negative, the program proceeds to S418 in which TRPV 68 is made OFF. When the result in S412, or S414, or S416 is affirmative, the program proceeds to S420 in which the bit of the flag is reset to zero, and to S418 in which TRPV 68 is made OFF.

In the fourth embodiment, since the adsorption limit of the adsorber 74, in other words, the period during which the bypass valve member 60 is kept open is determined based on the parameter relating to the volume or amount of exhaust gas, the system has the same advantages as those mentioned in the first embodiment. The rest of the configuration is the same as that of the first embodiment.

In the fourth embodiment, it is alternatively possible to correct the upper limit ToutLMT as the increase of the catalyst temperature (or the coolant temperature Tw). If the degradation or deterioration of the adsorber is detected, it is alternatively possible to correct the limit in response to the adsorber degradation.

It is alternatively possible to detect the quantity or amount of intake air by an air flow meter and to determine the time or period by an accumulated value of the detected quantity or amount of intake air. It is alternatively possible to accumulate, instead of the output quantity of fuel injection, the basic quantity of fuel injection TiM-F.

Thus, the embodiments are configured such that the system for purifying exhaust gas generated by an internal combustion engine (10) having an air intake system (air intake pipe 12) and an exhaust system which includes an exhaust pipe (38) extending from an exhaust manifold (36) of the engine and a catalyst (40, 42, 44) installed in the exhaust pipe, the exhaust system exhausting gas generated by the engine to the atmosphere, including a bypass (56) branching out from the exhaust pipe (38) at a location (fork 54) downstream of the catalyst and merging to the exhaust pipe downstream (confluence point 78) of the branching point (fork 54); an adsorber (74) installed in the bypass; a valve means (bypass valve member 60) which closes the bypass (56); a conduit (EGR conduit 82) connected to the bypass (38) at one end and connected to the air intake system (air intake pipe 12) for recirculating the exhaust gas to the air intake system; valve control means (ECU 86) which opens the valve means (bypass valve member 60) for a period (TTRSLMT, ToutLMT) after the startup of the engine to introduce the exhaust gas to the bypass (56) such that the adsorber (74) installed in the bypass adsorbs the unburnt component in the exhaust gas; an EGR control means (ECU 86) which causes the exhaust gas introduced in the bypass to be recirculated to the air intake system through the conduit (EGR conduit 83). In the system, the valve means (bypass valve member 60) is provided at or close to the branching point (fork 54) in the exhaust pipe (38), a chamber (52) is provided close to the branching point (fork 54) such that the conduit (EGR conduit 82) is connected to the bypass at one end in the chamber.

It should be noted in the above that the description saying that "a chamber (52) is provided close to the branching point (fork 54) such that the conduit (EGR conduit 82) is connected to the bypass at one end in the chamber" means that the conduit 82 is connected upstream of the adsorber 84 in terms of exhaust gas flow, or is connected downstream of the adsorber 84 in terms of recirucluated exhaust gas flow.

It should also be noted that the description saying that "for a period (TTRSLMT, ToutLMT) after the startup of the engine", means for a period after the startup of the engine and a period until a negative pressure is generated to drive the valve means to open when the valve means is operated by the negative pressure.

With the arrangement, the system can effectively prevent the exhaust pipe from being clogged even when a valve for closing a bypass is stuck in the closed position, and can provide a relatively short EGR conduit for recirculating unburnt HC component adsorbed from the adsorber. Also, the adsorption and desorption are conducted optimally.

It is alternatively possible to combine the fourth embodiment into the first embodiment such that the time or period is determined from the accumulated value of fuel injecfion amount and the catalyst (coolant) temperature.

In the first to fourth embodiments, while the ignition timing retard is used for expedite the catalyst activation, it is one example and should not be limited thereto.

In the first to fourth embodiments, it is alternatively possible to utilize an electric actuator to operate the exhaust pipe valve member and the bypass valve member.

In the first to fourth embodiments, it is alternatively possible to use an adsorber made from activated charcoal.

While the invention has thus been shown and described with reference to specific embodiments, it should be noted that the invention is in no way limited to the details of the described arrangements but changes and modifications may be made without departing from the scope of the appended claims.

What is claimed is:

1. A system for purifying exhaust gas generated by an internal combustion engine having an air intake system and an exhaust system which includes an exhaust pipe extending from an exhaust manifold of the engine and a catalyst installed in the exhaust pipe, the exhaust system exhausting gas generated by the engine to the atmosphere, including:

a bypass branching out from the exhaust pipe at a location downstream of the catalyst and merging to the exhaust pipe downstream of the branching point;

an adsorber installed in the bypass;

a valve means which closes the bypass;

a conduit connected to the bypass at one end and connected to the air intake system for recirculating the exhaust gas to the air intake system;

valve control means which opens the valve means for a period since starting of the engine to introduce the exhaust gas to the bypass such that the adsorber installed in the bypass adsorbs the unburnt component in the exhaust gas; and an EGR control means which causes the exhaust gas introduced in the bypass to be recirculated to the air intake system through the conduit;

wherein the improvement comprises:

the valve means is provided adjacent the branching point in the exhaust pipe; and a chamber is provided surrounding the branching point such that the conduit is connected to the bypass at one end in the chamber.

2. A system according to claim 1, wherein the chamber encloses a part of the exhaust pipe such that the part of the exhaust pipe is close to the adsorber.

3. A system according to claim 1, wherein the chamber encloses a part of the exhaust pipe at the branching point and the valve means.

4. A system according to claim 2, wherein the chamber encloses a part of the exhaust pipe at the branching point and the valve means.

5. A system according to claim 1, further including a combination valve comprised of the valve means which closes the bypass and a second valve means which closes the exhaust pipe, the valve means and the second valve means being connected to a shaft such that when the valve means closes the bypass, the second valve opens the exhaust pipe.

6. A system according to claim 2, further including a combination valve comprised of the valve means which closes the bypass and a second valve means which closes the exhaust pipe, the valve means and the second valve means being connected to a shaft such that when the valve means closes the bypass, the second valve opens the exhaust pipe.

7. A system according to claim 1, wherein the valve control means including;

catalyst temperature parameter detecting means for detecting a parameter relating to a temperature of the catalyst;

and determines a period based on the detected parameter.

8. A system according to claim 7, wherein the valve control means decreases the period with increasing temperature of the catalyst.

9. A system according to claim 7, wherein the valve control means decreases the period when the engine is under high load.

10. A system according to claim 7, wherein the valve control means decreases the period when the engine is in a failsafe condition.

11. A system according to claim 7, wherein the parameter is a coolant temperature of the engine.

12. A system according to claim 11, wherein the valve control means decreases the period with increasing temperature of the catalyst.

13. A system according to claim 11, wherein the valve control means decreases the period when the engine is under high load.

14. A system according to claim 11, wherein the valve control means decreases the period when the engine is in a failsafe condition.

15. A system according to claim 1, wherein the valve control means including;

exhaust gas volume parameter detecting means for detecting a parameter relating to a volume of the exhaust gas;

and determines a period based on the detected parameter.

16. A system according to claim 15, wherein the valve control means decreases the period when the engine is under high load.

17. A system according to claim 15, wherein the valve control means decreases the period when the engine is in a failsafe condition.

18. A system according to claim 15, wherein the parameter is a quantity of fuel injection to be supplied to the engine.

19. A system according to claim 18, wherein the valve control means decreases the period when the engine is under high load.

20. A system according to claim 18, wherein the valve control means decreases the period when the engine is in a failsafe condition.

21. A system according to claim 1, further including:

catalyst activation promoting means for promoting activation of the catalyst when the engine is started.

22. A system according to claim 21, wherein the catalyst activation promoting means comprising an ignition timing control means which retards an ignition timing supplied to the engine.

23. A system according to claim 22, wherein the ignition timing means discontinues to retard the ignition timing under a specific engine operating condition.

24. A system according to claim 1, wherein the EGR control means including;

fuel injection quantity determining means for determining a quantity of fuel injection to be supplied to the engine;

air/fuel ratio detecting means for detecting an air/fuel ratio of the exhaust gas;

a feedback loop means having a controller which calculates a feedback correction coefficient using a control law expressed in a recursion formula such that the detected air/fuel ratio converges to a desired air/fuel ratio;

EGR correction coefficient calculating means for calculating an EGR correction coefficient when recirculating the exhaust gas to the air intake system;

fuel injection quantity correcting means for correcting the quantity of fuel injection based on at least the feedback correction coefficient and the EGR correction coefficient.

* * * * *